United States Patent
Moll

(10) Patent No.: US 12,333,658 B2
(45) Date of Patent: Jun. 17, 2025

(54) GENERATING USER INTERFACES DISPLAYING AUGMENTED REALITY GRAPHICS

(71) Applicant: Snap Inc., Santa Monica, CA (US)

(72) Inventor: Sharon Moll, Lachen (CH)

(73) Assignee: SNAP INC., Santa Monica, CA (US)

(*) Notice: Subject to any disclaimer, the term of this patent is extended or adjusted under 35 U.S.C. 154(b) by 155 days.

(21) Appl. No.: 18/172,083

(22) Filed: Feb. 21, 2023

(65) Prior Publication Data
US 2024/0282058 A1 Aug. 22, 2024

(51) Int. Cl.
G06T 19/00 (2011.01)
G06F 3/04815 (2022.01)

(52) U.S. Cl.
CPC ........ *G06T 19/006* (2013.01); *G06F 3/04815* (2013.01)

(58) Field of Classification Search
None
See application file for complete search history.

(56) References Cited

U.S. PATENT DOCUMENTS

| | | |
|---|---|---|
| 7,971,156 B2 | 6/2011 | Albertson et al. |
| 7,996,793 B2 | 8/2011 | Latta et al. |
| 8,487,938 B2 | 7/2013 | Latta et al. |
| 8,856,691 B2 | 10/2014 | Geisner et al. |
| 9,225,897 B1 | 12/2015 | Sehn et al. |
| 9,230,160 B1 | 1/2016 | Kanter |
| 9,276,886 B1 | 3/2016 | Samaranayake |
| 9,384,578 B2 | 7/2016 | Friesen |
| 9,483,556 B1 | 11/2016 | Cohen et al. |
| 9,705,831 B2 | 7/2017 | Spiegel |
| 9,742,713 B2 | 8/2017 | Spiegel et al. |
| 10,102,423 B2 | 10/2018 | Shaburov et al. |
| 10,284,508 B1 | 5/2019 | Allen et al. |

(Continued)

FOREIGN PATENT DOCUMENTS

| | | |
|---|---|---|
| CN | 103760972 A | 4/2014 |
| CN | 103049761 B | 8/2016 |

(Continued)

OTHER PUBLICATIONS

"Artivive—A resource for mobilizing the use of Artivive, an augmented reality art technology, to enhance and scale creative pedagogy.", [Online]. Retrieved from the Internet: <https://artsdesign.berkeley.edu/artivive>, (2021), 6 pgs.

(Continued)

*Primary Examiner* — Nicholas R Wilson
(74) *Attorney, Agent, or Firm* — SCHWEGMAN LUNDBERG & WOESSNER, P.A.

(57) ABSTRACT

An Augmented Reality (AR) graphics system is provided. The AR graphics system may coordinate the display of augmented reality graphics created by multiple users located in an environment. The AR graphics system may determine an alignment object located in the environment that is designated as a common origin of a real-world coordinate system that is used to determine where to display AR graphics within the environment. Additionally, a prioritization scheme is implemented to resolve conflicts between overlapping input provided by different users in order to generate a single version of AR graphics.

20 Claims, 16 Drawing Sheets

(56) References Cited

U.S. PATENT DOCUMENTS

| | | |
|---|---|---|
| 10,339,175 B2 | 7/2019 | Cohen et al. |
| 10,439,972 B1 | 10/2019 | Spiegel et al. |
| 10,509,466 B1 | 12/2019 | Miller et al. |
| 10,509,865 B2 | 12/2019 | Hackett et al. |
| 10,514,876 B2 | 12/2019 | Sehn |
| 10,579,869 B1 | 3/2020 | Xiong et al. |
| 10,581,940 B1 | 3/2020 | Lyer et al. |
| 10,614,855 B2 | 4/2020 | Huang |
| 10,748,347 B1 | 8/2020 | Li et al. |
| 10,852,838 B2 | 12/2020 | Bradski et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,050,803 B2 | 6/2021 | Lyer et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,307,747 B2 | 4/2022 | Dancie et al. |
| 11,531,402 B1 | 12/2022 | Stolzenberg |
| 11,546,505 B2 | 1/2023 | Canberk |
| 11,800,059 B2 | 10/2023 | Chalmers et al. |
| 11,863,596 B2 | 1/2024 | Bauer et al. |
| 2009/0012788 A1 | 1/2009 | Gilbert et al. |
| 2011/0041059 A1 | 2/2011 | Amarasingham et al. |
| 2011/0301934 A1 | 12/2011 | Tardif |
| 2014/0078109 A1 | 3/2014 | Armstrong-Muntner |
| 2014/0171036 A1 | 6/2014 | Simmons |
| 2015/0040040 A1 | 2/2015 | Balan et al. |
| 2015/0120293 A1 | 4/2015 | Wohlert et al. |
| 2015/0269783 A1 | 9/2015 | Yun |
| 2015/0370320 A1 | 12/2015 | Connor |
| 2016/0026253 A1 | 1/2016 | Bradski et al. |
| 2017/0091980 A1 | 3/2017 | Sebastian et al. |
| 2017/0123487 A1 | 5/2017 | Hazra et al. |
| 2017/0277684 A1 | 9/2017 | Dharmarajan Mary |
| 2017/0277685 A1 | 9/2017 | Takumi |
| 2017/0351910 A1 | 12/2017 | Elwazer et al. |
| 2017/0358141 A1 | 12/2017 | Stafford et al. |
| 2017/0371432 A1 | 12/2017 | Gavriliuc et al. |
| 2018/0012412 A1 | 1/2018 | Scavezze et al. |
| 2018/0130259 A1 | 5/2018 | Leefsma et al. |
| 2018/0158370 A1 | 6/2018 | Pryor |
| 2019/0025590 A1* | 1/2019 | Haddick ............... G02B 27/14 |
| 2019/0034765 A1 | 1/2019 | Kaehler et al. |
| 2019/0094981 A1 | 3/2019 | Bradski et al. |
| 2019/0313056 A1 | 10/2019 | Harrison et al. |
| 2019/0356758 A1 | 11/2019 | Finn et al. |
| 2020/0059502 A1 | 2/2020 | Iyer et al. |
| 2020/0168119 A1 | 5/2020 | Ramani et al. |
| 2021/0011612 A1 | 1/2021 | Dancie et al. |
| 2021/0034161 A1 | 2/2021 | Potts et al. |
| 2021/0043005 A1 | 2/2021 | Arora et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0201530 A1 | 7/2021 | Cowburn et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0306386 A1 | 9/2021 | Smith et al. |
| 2021/0368136 A1 | 11/2021 | Chalmers et al. |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0188539 A1 | 6/2022 | Chan et al. |
| 2022/0206588 A1 | 6/2022 | Canberk et al. |
| 2022/0254096 A1* | 8/2022 | Berliner ............... G06F 3/0346 |
| 2022/0291753 A1 | 9/2022 | Erivantcev et al. |
| 2022/0300730 A1 | 9/2022 | Eirinberg et al. |
| 2022/0300731 A1 | 9/2022 | Eirinberg et al. |
| 2022/0326781 A1 | 10/2022 | Hwang et al. |
| 2022/0334649 A1 | 10/2022 | Hwang et al. |
| 2023/0114043 A1 | 4/2023 | Wan et al. |
| 2023/0179641 A1 | 6/2023 | Bauer et al. |
| 2023/0410441 A1 | 12/2023 | Moll |
| 2023/0412650 A1 | 12/2023 | Bauer et al. |

FOREIGN PATENT DOCUMENTS

| | | |
|---|---|---|
| CN | 105874450 A | 8/2016 |
| CN | 107430858 A | 12/2017 |
| CN | 111966216 A | 11/2020 |
| CN | 118355646 A | 7/2024 |
| EP | 3707693 A1 | 9/2020 |
| KR | 20020039882 A | 5/2002 |
| KR | 20100109518 A | 10/2010 |
| KR | 20220158824 A | 12/2022 |
| WO | WO-2016168591 A1 | 10/2016 |
| WO | WO-2019094618 A1 | 5/2019 |
| WO | WO-2019143572 A1 | 7/2019 |
| WO | WO-2020087176 A1 | 5/2020 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |
| WO | WO-2023107846 A1 | 6/2023 |
| WO | WO-2023250361 A1 | 12/2023 |
| WO | WO-2024177967 A1 | 8/2024 |

OTHER PUBLICATIONS

"U.S. Appl. No. 17/845,626, Final Office Action mailed Aug. 23, 2023".

"U.S. Appl. No. 17/845,626, Non Final Office Action mailed May 12, 2023".

"U.S. Appl. No. 17/845,626, Response filed Apr. 27, 2023 to Restriction Requirement mailed Feb. 27, 2023", 14 pgs.

"U.S. Appl. No. 17/845,626, Response filed Aug. 14, 23 to Non Final Office Action mailed May 12, 2023", 12 pgs.

"U.S. Appl. No. 17/845,626, Response filed Nov. 21, 23 to Final Office Action mailed Aug. 23, 2023", 14 pgs.

"U.S. Appl. No. 17/845,626, Restriction Requirement mailed Feb. 27, 2023".

"International Application Serial No. PCT/US2023/068794, International Search Report mailed Oct. 16, 2023", 4 pgs.

"International Application Serial No. PCT/US2023/068794, Written Opinion mailed Oct. 16, 2023", 5 pgs.

"U.S. Appl. No. 17/845,626, Advisory Action mailed Aug. 8, 2024", 3 pgs.

"U.S. Appl. No. 17/845,626, Final Office Action mailed May 16, 2024", 37 pgs.

"U.S. Appl. No. 17/845,626, Non Final Office Action mailed Feb. 8, 2024", 31 pgs.

"U.S. Appl. No. 17/845,626, Notice of Allowance mailed Dec. 18, 2024", 8 pgs.

"U.S. Appl. No. 17/845,626, Response filed May 8, 2024 to Non Final Office Action mailed Feb. 8, 2024", 16 pgs.

"U.S. Appl. No. 17/845,626, Response filed Jul. 31, 2024 to Final Office Action mailed May 16, 2024", 20 pgs.

"International Application Serial No. PCT/US2024/016458, International Search Report mailed May 6, 2024", 3 pgs.

(56) References Cited

OTHER PUBLICATIONS

"International Application Serial No. PCT/US2024/016458, Written Opinion mailed May 6, 2024", 9 pgs.

* cited by examiner

GENERATING USER INTERFACES DISPLAYING AUGMENTED REALITY GRAPHICS

TECHNICAL FIELD

The present disclosure relates generally to the generating user interfaces displaying augmented reality graphics.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." As used herein, the term AR refers to either or both augmented reality and virtual reality as traditionally understood, unless the context indicates otherwise.

A user of the head-worn device may access and use a computer software application to perform various tasks or engage in an entertaining activity. To use the computer software application, the user interacts with a user interface provided by the head-worn device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
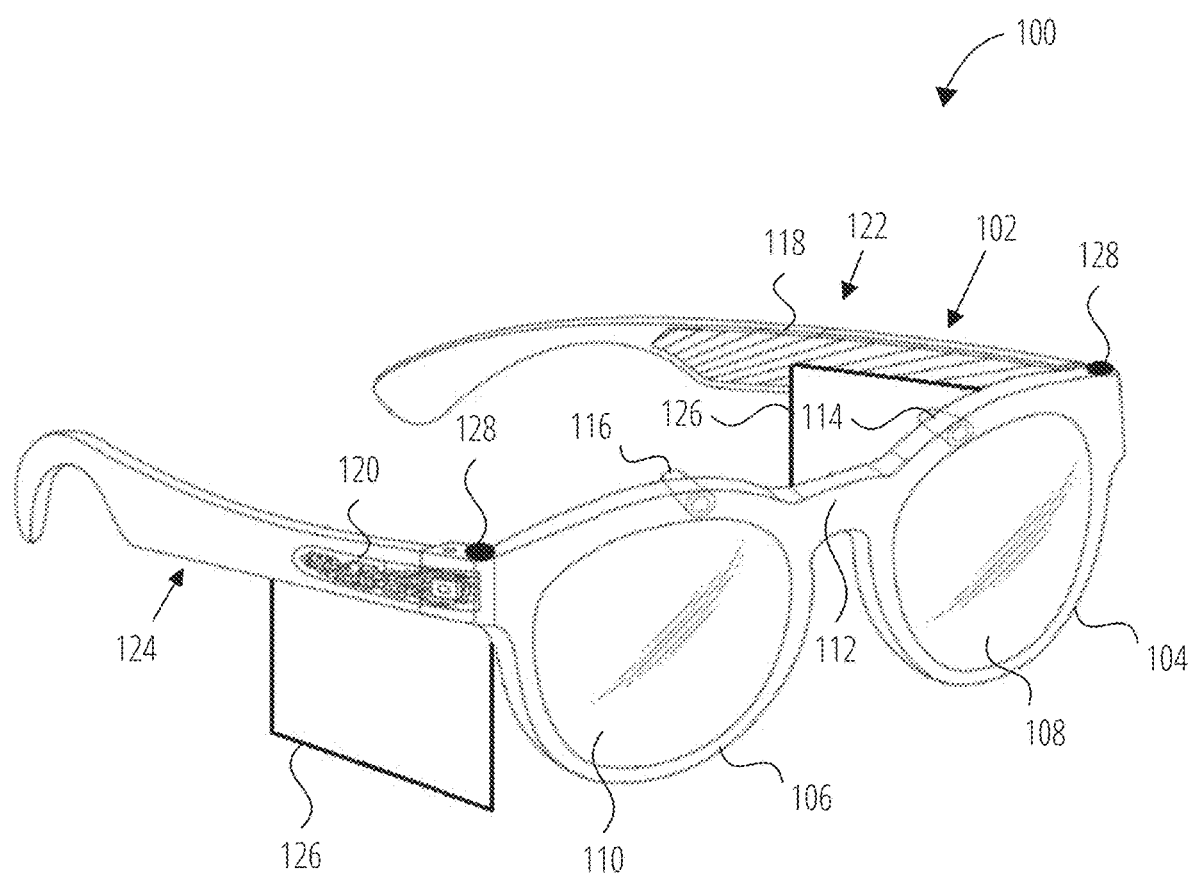
FIG. 1 is a perspective view of a head-worn device, in accordance with one or more examples.

Augmented reality graphics, such as paintings or drawings, may be created by individuals located in an environment by moving an input device, such as a brush, finger, or pen. The augmented reality graphics may be created in relation to an app that is executed by a head-worn device, such as glasses, goggles, or a headset. Multiple users may create augmented reality graphics in the same environment. Implementations described herein are directed to synchronizing the creation and viewing of augmented reality graphics by a number of different users located in an environment. In some examples, augmented reality graphics created by one user at a first location in the environment may be viewed by other users in the environment at the first location even though the other users may be viewing the augmented reality graphics from a different perspective. In this way, the location of the augmented reality graphics may be viewed by each user in the environment at a consistent location.

In many augmented reality systems, users may interact with virtual objects that are displayed in their environment. An input modality that may be utilized with AR systems is hand-tracking combined with Direct Manipulation of Virtual Objects (DMVO) where a user is provided with a user interface that is displayed to the user in an AR overlay having a two-dimensional (2D) or three-dimensional (3D) rendering. The rendering is of a graphic model in 2D or 3D where virtual objects located in the model correspond to interactive elements of the user interface. In this way, the user perceives the virtual objects as objects within an overlay in the user's field of view of the real-world scene while wearing the AR system or perceives the virtual objects as objects within a virtual world as viewed by the user while wearing the AR system. To allow the user to manipulate the virtual objects, the AR system detects the user's hands and tracks their movement, location, and/or position to determine the user's interactions with the virtual objects.

However, in existing systems, user interactions with virtual objects in an AR environment lack haptic feedback. To illustrate, as users touch and interact with virtual objects in an AR environment, there is typically no sensation being felt in a user's fingers, hands, or limbs in response to touching the virtual object. Thus, although users may see that a virtual object is being touched, without haptic feedback being provided in response to a user's interaction, the user's interaction with the virtual object may be awkward or result in frustration for the user. For example, it may be challenging for a user to gauge how a virtual object may move or otherwise react to their interaction with the virtual object.

Additionally, in scenarios where a state of a virtual object depends on a degree or amount of interaction with the virtual object, some interactions by a user may not activate a desired state of the virtual object. To illustrate, in situations where a user is attempting to write, paint, or draw on a virtual surface, in the absence of haptic feedback, the width of the stroke produced by the interaction of a user with an input tool, such as a pen, brush, stylus, or finger, may not correspond to a user's intended result. Thus, the graphics generated in response to these interactions may not correspond to the intended graphics. As a result, the user's experience in the AR environment would be different from the user's experience painting, drawing, or writing using physical tools that interact with physical media.

In at least some cases, drawing, writing, or painting functions may not be activated unless a particular state of a virtual object is activated based on proximity of the input tool with respect to the virtual object. For example, if an input tool is not touching a virtual object that is to be marked, the functionality to draw, paint, write, or otherwise mark on the virtual object may not be activated. However, without haptic feedback a user may be unable to gauge whether or not the input tool is touching the virtual object, resulting in the graphic being produced by the user's interactions with the virtual object being different from the intended graphic.

In one or more examples, implementations of an augmented reality graphics system may detect a surface in a real-world scene that may serve as an AR graphics display surface. The augmented reality graphics system may also detect a graphics input tool in the real-world scene and determine when the graphics input tool is within a threshold distance of the surface. In at least some examples, the augmented reality graphics system may determine when the graphics input tool is touching the surface. Drawing, writing, and/or painting functionality may be activated in response to the graphics input tool being within the threshold distance of the surface. The augmented reality graphics system may then track the motion of the graphics input tool and produce an augmented reality graphic that corresponds to the motion of the graphics input tool. In this way, a user may produce at least one of a drawing, a painting, handwriting, or a design using a physical surface in an environment, such as a wall, table, floor, etc., to produce a graphic without physically modifying the surface. That is, a user may create a painting using a surface included in an environment without actually applying paint to change a color of the surface.

By detecting a surface in a real-world scene and the motion of a graphics input tool in relation to the surface, a user may be provided with haptic feedback as the graphics input tool touches the surface. In this way, the markings produced by the use of the graphics input tool correspond more closely to the markings intended by the user than in situations where a virtual object is being used as a surface on which AR graphics are being produced. Additionally, in scenarios where an amount of pressure applied by a graphics input tool has an impact on an appearance of an AR graphic, such as when pressing a paintbrush harder on a surface causes a thicker marking to be made, the implementations described herein may also more accurately produce an AR graphic with the appearance intended by the user in relation to situations where a virtual object is being used as a surface on which AR graphics are being produced. Further, in situations where a state of an augmented reality content item is based on a proximity of the graphics input tool to a surface, implementations described herein may more accurately detect triggering conditions for activating a state of the augmented reality content item or the user application. In particular, the graphics input tool may change shape, such as a tip of a brush or finger bending, in response to touching a surface in a real-world scene. Thus, the accuracy of determining triggering conditions or selections of user interface elements that correspond to a location of a surface in a real-world environment may be more accurate and/or consume fewer computing and memory resources than in situations where the activation of a state or user interface element is based on proximity of a graphics input tool with a virtual object.

Additionally, in one or more implementations, the creation and viewing of AR graphics by multiple users in the same environment may be monitored and synchronized. In one or more examples, locations of AR graphics within an environment may be represented by real-world coordinates that are aligned to a common origin located in the environment. The common origin may correspond to an alignment object located in the environment. The alignment object may be determined by analyzing characteristics of a number of objects located in the environment and determining an object that may be a best candidate for an alignment object. In one or more illustrative examples, the alignment object may be identified based on an analysis determining that the alignment object is unlikely to move or change positions. Users within the environment may view AR graphics created by other users in the environment at a fixed location, such that the AR graphics are viewable at the same location by each user in the environment.

In at least some examples, the AR graphics may be generated as part of an AR graphics creation session that is initiated and managed by a lead user. For example, a teacher may initiate an AR graphics creation session that enables students within a classroom to join. The AR graphics creation session may be initiated through a user application. The students that have joined the AR graphics creation session may create AR graphics using a graphics input tool, such as a paint brush, finger, or pen, and view the AR graphics created by themselves or other users by using a head-worn device that is executing an instance of the user application. In situations where multiple users may create AR graphics proximate to one another such that AR graphics of users may overlap, the lead user may provide a level of version control when the input from multiple users conflicts in some way. In this way, a single version of each AR graphic is maintained and is viewable by users within an environment.

Other technical features may be readily apparent to one skilled in the art from the following figures, descriptions, and claims.

FIG. 1 is a perspective view of an AR system in a form of a head-worn device (e.g., glasses 100 of FIG. 1), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of computer 120 may be implemented as illustrated by the machine 1602 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real-world scene.

The glasses 100 may also include a touchpad 126 mounted to or integrated with one or both of the left temple piece 122 and right temple piece 124. The touchpad 126 is generally vertically arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
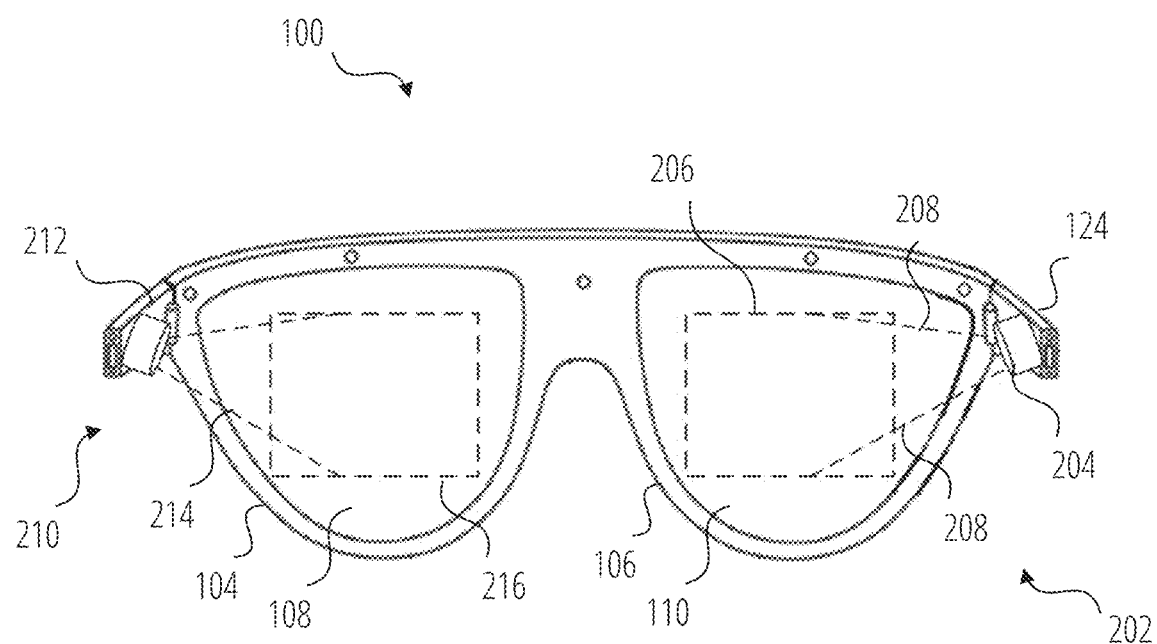
FIG. 2 is a further view of the head-worn device of FIG. 1, in accordance with one or more examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real-world scene seen by the user. Similarly, light 214 emitted by the projector 212 encounters the diffractive structures of the waveguide of the near eye display 216, which directs the light towards the left eye of a user to provide an image on or in the left optical element 108 that overlays the view of the real-world scene seen by the user. The combination of a GPU, the forward optical assembly 202, the left optical element 108, and the right optical element 110 provide an optical engine of the glasses 100. The glasses 100 use the optical engine to generate an overlay of the real-world scene view of the user including display of a user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various user interfaces on the near eye displays. As described in more detail herein, the user can then interact with the glasses 100 using a touchpad 126 and/or the buttons 128, voice inputs or touch inputs on an associated device (e.g., user system 1502 illustrated in FIG. 15), and/or hand movements, locations, and positions detected by the glasses 100.

Figure 3:
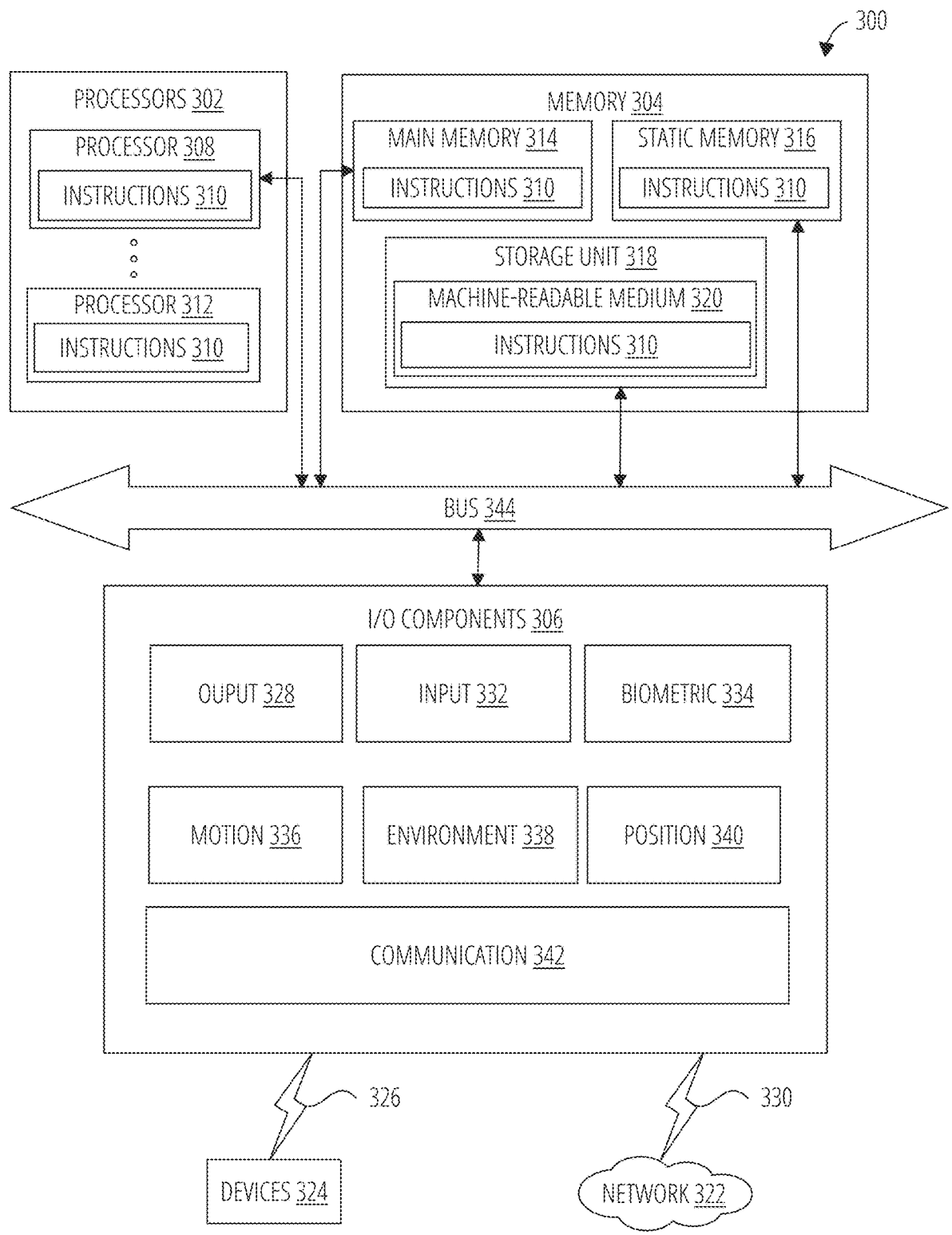
FIG. 3 is a diagrammatic representation of a machine, in the form of a computing apparatus within which a set of instructions may be executed for causing the machine to perform any one or more of the methodologies discussed herein in accordance with one or more examples.

FIG. 3 is a diagrammatic representation of a computing apparatus 300 within which instructions 310 (e.g., software, a program, an application, an applet, an app, or other executable code) for causing the computing apparatus 300 to perform any one or more of the methodologies discussed herein may be executed. The computing apparatus 300 may be utilized as a computer 120 of glasses 100 of FIG. 1. For example, the instructions 310 may cause the computing apparatus 300 to execute any one or more of the methods described herein. The instructions 310 transform the general, non-programmed computing apparatus 300 into a particular computing apparatus 300 programmed to carry out the described and illustrated functions in the manner described. The computing apparatus 300 may operate as a standalone device or may be coupled (e.g., networked) to other machines. In a networked deployment, the computing apparatus 300 may operate in the capacity of a server machine or a client machine in a server-client network environment, or as a peer machine in a peer-to-peer (or distributed) network environment. The computing apparatus 300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 310, sequentially or otherwise, that specify actions to be taken by the computing apparatus 300. Further, while a single computing apparatus 300 is illustrated, the term "machine" may also be taken to include a collection of machines that individually or jointly execute the instructions 310 to perform any one or more of the methodologies discussed herein.

The computing apparatus 300 may include processors 302, memory 304, and I/O components 306, which may be configured to communicate with one another via a bus 344. In some examples, the processors 302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 308 and a processor 312 that execute the instructions 310. The term "processor" is intended to include multi-core processors that may comprise two or more independent processors (sometimes referred to as "cores") that may execute instructions contemporaneously. Although FIG. 3 shows multiple processors 302, the computing apparatus 300 may include a single processor with a single core, a single processor with multiple cores (e.g., a multi-core processor), multiple processors with a single core, multiple processors with multiples cores, or any combination thereof.

The memory 304 includes a main memory 314, a static memory 316, and a storage unit 318, both accessible to the processors 302 via the bus 344. The main memory 304, the static memory 316, and storage unit 318 store the instructions 310 embodying any one or more of the methodologies or functions described herein. The instructions 310 may also reside, completely or partially, within the main memory 314, within the static memory 316, within machine-readable medium 320 within the storage unit 318, within one or more of the processors 302 (e.g., within the processor's cache memory), or any suitable combination thereof, during execution thereof by the computing apparatus 300.

The I/O components 306 may include a wide variety of components to receive input, provide output, produce output, transmit information, exchange information, capture measurements, and so on. The specific I/O components 306 that are included in a particular machine will depend on the type of machine. For example, portable machines such as mobile phones may include a touch input device or other such input mechanisms, while a headless server machine will likely not include such a touch input device. It will be appreciated that the I/O components 306 may include many other components that are not shown in FIG. 3. In various examples, the I/O components 306 may include output components 328 and input components 332. The output components 328 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 332 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 306 may include biometric components 334, motion components 336, environmental components 338, and position components 340, among a wide array of other components. For example, the biometric components 334 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 336 may include inertial measurement units, acceleration sensor components (e.g., accelerometer), gravitation sensor components, rotation sensor components (e.g., gyroscope), and so forth. The environmental components 338 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding physical environment. The position components 340 may include location sensor components (e.g., a GPS receiver component), altitude sensor components (e.g., altimeters or barometers that detect air pressure from which altitude may be derived), orientation sensor components (e.g., an Inertial Measurement Unit (IMU)), and the like.

Communication may be implemented using a wide variety of technologies. The I/O components 306 further include communication components 342 operable to couple the computing apparatus 300 to a network 322 or devices 324 via a coupling 330 and a coupling 326, respectively. For example, the communication components 342 may include a network interface component or another suitable device to interface with the network 322. In further examples, the communication components 342 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 324 may be another machine or any of a wide variety of peripheral devices (e.g., a peripheral device coupled via a USB).

Moreover, the communication components 342 may detect identifiers or include components operable to detect identifiers. For example, the communication components 342 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 342, such as location via Internet Protocol (IP) geolocation, location via Wi-Fi® signal triangulation, location via detecting an NFC beacon signal that may indicate a particular location, and so forth.

The various memories (e.g., memory 304, main memory 314, static memory 316, and/or memory of the processors 302) and/or storage unit 318 may store one or more sets of instructions and data structures (e.g., software) embodying or used by any one or more of the methodologies or functions described herein. These instructions (e.g., the instructions 310), when executed by processors 302, cause various operations to implement the disclosed examples.

The instructions 310 may be transmitted or received over the network 322, using a transmission medium, via a network interface device (e.g., a network interface component included in the communication components 342) and using any one of a number of well-known transfer protocols (e.g., hypertext transfer protocol (HTTP)). Similarly, the instructions 310 may be transmitted or received using a transmission medium via the coupling 326 (e.g., a peer-to-peer coupling) to the devices 324.

Figure 4:
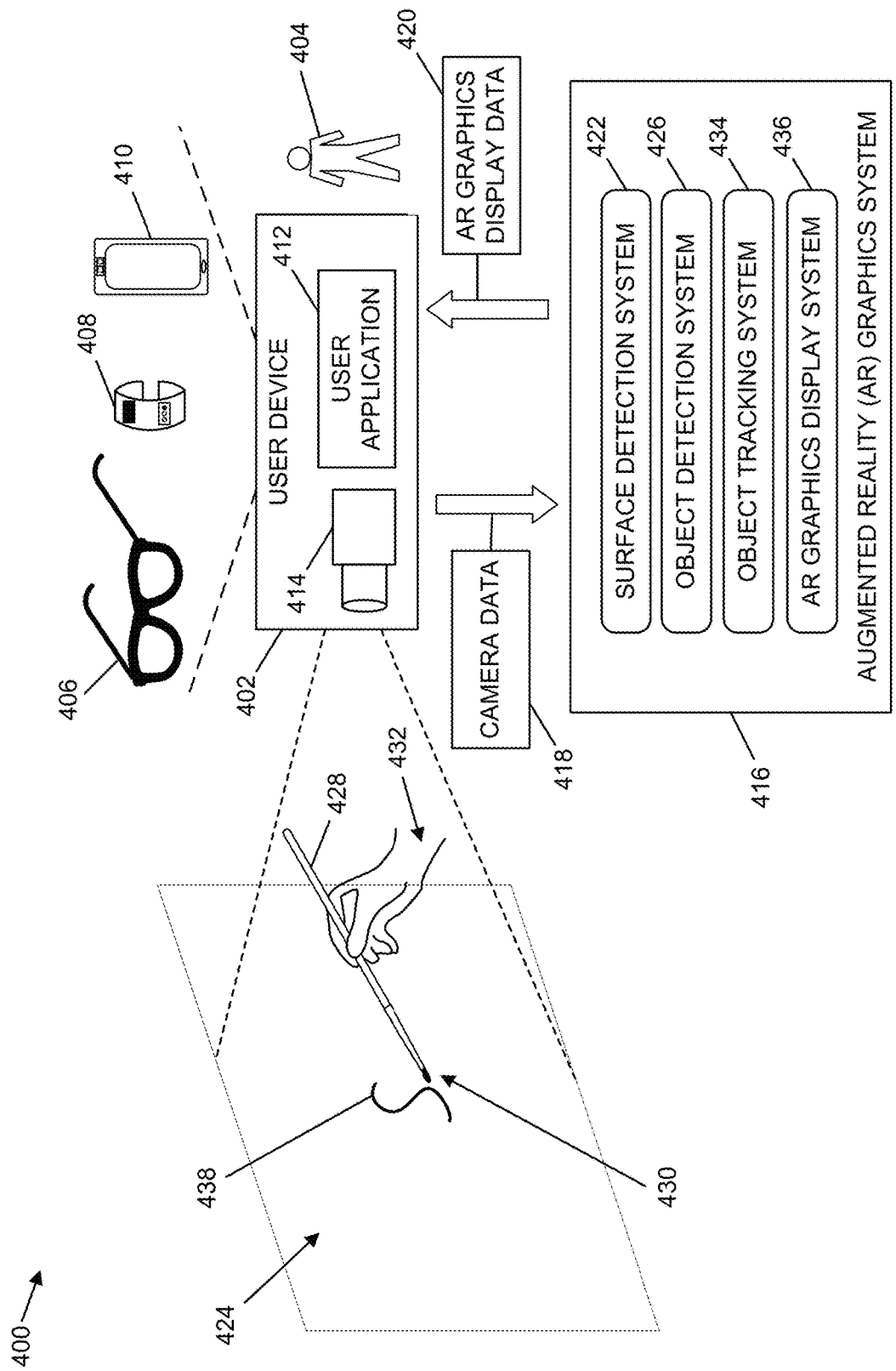
FIG. 4 is a diagram of an environment including a number of computing systems and devices to detect surfaces and cause user interfaces to be displayed with respect to the surfaces that include augmented reality graphics, in accordance with one or more examples.

FIG. 4 is a diagram of an environment 400 including a number of computing systems and devices to detect surfaces and cause user interfaces to be displayed with respect to the surfaces that include augmented reality graphics, in accordance with one or more examples. The environment 400 may include a user device 402. The user device 402 may be operated by a user 404. The user device 402 may include a number of computing devices having processing resources and memory resources. For example, the user device 402 may include at least one of a head-worn device 406, a wearable device 408, or a mobile computing device 410, such as a smart phone. In various examples, the user device 402 may include multiple computing devices that operate in conjunction with one another. To illustrate, the head-worn device 406 may operate in conjunction with at least one of the wearable device 408 or the mobile computing device 410 or the wearable device 408 may operate in conjunction with the mobile computing device 410. In one or more illustrative examples, the user device 402 may include the glasses 100 of FIG. 1.

The processing resources and the memory resources of the user device 402 may execute a number of applications, such as user application 412. In one or more examples, the user application 412 may include messaging functionality that enables users of the user application 412 to send messages to and receive messages from other users of the user application 412. In one or more additional examples, the user application 412 may include social networking functionality that enables users of the user application 412 to share content with other users of the user application 412 and/or to access content created by other users of the user application 412. In one or more illustrative examples, the user application 412 may include at least one of the interaction client 1504 or the application 1506 described in more detail with respect to FIG. 15.

The user device 402 may also include one or more cameras, such as camera 414. Camera 414 may capture images of an environment in which the user device 402 is located. In one or more examples, the camera 414 may capture video of an environment in which the user device 402 is located. The video may comprise at least one of a series of images or a stream of images captured during a period of time. In various examples, the camera 414 may capture video of a real-world scene in response to input from the user 404. The images captured by the camera 414 may be within a field of view of the camera 414. The field of view may correspond to a portion of an environment that may be imaged by the camera 414 at a given time and may be based on focal length of a lens of the camera 414 and a size of a sensor of the camera 414. Although not shown in the illustrative example of FIG. 4, the user device 402 may also include a number of audio capture devices. To illustrate, the user device 402 may include a number of microphones to capture audio content produced in an environment in which the user device 402 is located. In various examples, the user device 402 may include one or more microphones to capture audio content in conjunction with video content captured by the camera 414.

The environment 400 may also include an augmented reality (AR) graphics system 416. The AR graphics system 416 may generate augmented reality graphics that are displayed in an environment in which the user device 402 is located. For example, the AR graphics system 416 may generate augmented reality graphics that are generated within a real-world scene captured by the camera 414. The augmented reality graphics and the real-world scene may be visible via a display device of the user device 402, but the augmented reality graphics may not be visible outside of the display device of the user device 402. Although the AR graphics system 416 is shown outside of the user device 402 in the illustrative example of FIG. 4, in one or more implementations, at least a portion of the operations performed by the AR graphics system 416 may be executed by the user device 402. In one or more illustrative examples, the user device 402 may include at least a portion of the AR graphics system 416.

The augmented reality graphics may be generated in conjunction with an augmented reality content item. Augmented reality content items may include program code that is executable to perform one or more functions. In various examples, augmented reality content items may be executable within the user application 412. For example, an instance of the user application 412 may be activated by the user device 402 and one or more user interfaces of the user application 412 may be displayed via the user device 402. Augmented reality content items may be selected while viewing one or more user interfaces of the user application 412 and executed to activate one or more functions that correspond to the selected augmented reality content item.

In one or more examples, augmented reality content items may be executable to modify an appearance of one or more objects included in an image captured by the camera 414. To illustrate, an augmented reality content item may be executable to alter an appearance of a face included in an image captured by the camera 414. Additionally, an augmented reality content item may be executable to generate one or more augmented reality graphics in relation to one or more objects included in an image captured by the camera 414. In one or more illustrative examples, an augmented reality content item may be executable to cause a crown to appear on a head of an individual included in an image captured by the camera 414. Further, an augmented reality content item may by executable to generate one or more animations in relation to one or more objects included in an image captured by the camera 414. In one or more additional illustrative examples, an augmented reality content item may be executable to cause stars to circle above a head of an individual included in an image captured by the camera 414. In one or more further illustrative examples, an augmented reality content item may be executable to display information obtained from one or more sources. For example, an augmented reality content item may be executable to display movie times and locations within one or more user interfaces of the user application 412.

In one or more examples, the AR graphics system 416 may obtain camera data 418 generated by the camera 414. The camera data 418 may include one or more images captured by the camera 414 of a real-world scene. The AR graphics system 416 may analyze the camera data 418 to generate AR graphics display data 420. The AR graphics display data 420 may include one or more AR graphics that are displayed in conjunction with one or more objects included in a real-world scene captured by the camera 414. In one or more illustrative examples, the AR graphics display data 420 may at least one of include or be used to generate user interface data that corresponds to one or more user interfaces that include the AR graphics display data 420. In various examples, operations of the AR graphics system 416 may be performed in response to activation of an augmented reality content item of the user application 412.

The AR graphics system 416 may include a surface detection system 422 that may detect one or more surfaces included in the camera data 418. The surface detection system 422 may analyze the camera data 418 to determine one or more target objects that may correspond to a surface. For example, the surface detection system 422 may analyze the camera data 418 to identify objects having a number of characteristics. To illustrate, the surface detection system 422 may analyze the camera data 418 to identify objects having one or more shapes, one or more dimensions, one or more colors, one or more textures, one or more combinations thereof, and so forth. In various examples, the characteristics of target objects may correspond to characteristics of AR graphics display surfaces. In one or more examples, AR graphics display surfaces may have characteristics that are conducive to writing, drawing, painting, marking, one or more combinations thereof, and the like. In one or more illustrative examples, AR graphics display surfaces may have at least minimum dimensions, such as a minimum length and a minimum width, and/or maximum dimensions, such as a maximum length or a maximum width. In one or more illustrative examples, AR graphics display surfaces may have one or more textures. In various examples, AR graphics display surfaces may have a relatively flat texture or less than a maximum amount of surface roughness. In one or more additional illustrative examples, AR graphics display surfaces may have one or more colors that are conducive to the display of at least one of writing, drawing, painting, or other marking. In one or more further illustrative examples, the surface detection system 422 may analyze the camera data 418 to identify at least one of at least a portion of a wall, at least a portion of a floor, at least a portion of a table, at least a portion of a canvas, at least a portion of a whiteboard, at least a portion of a screen, or at least a portion of another surface on which AR graphics may be displayed plainly. In the illustrative example of FIG. 4, the surface detection system 422 may analyze the camera data 418 to identify an AR graphics display surface 424.

In situations where multiple target objects correspond to AR graphics display surfaces, the surface detection system 422 may analyze the camera data 418 to determine a candidate object that is most likely to be an AR graphics display surface. For example, the surface detection system 422 may determine rankings of candidate objects based on the characteristics of the candidate objects with respect to one or more criteria that are representative of AR graphics display surfaces. In these scenarios, the surface detection system 422 determines a candidate object having a highest ranking to be the AR graphics display surface 424. In various examples, the surface detection system 422 may evaluate values of individual candidate objects with respect to specified values of characteristics of AR graphics display surfaces to determine a respective score for the individual candidate objects. The score may indicate an amount of similarity between the values of the characteristics of the candidate objects and the values of the characteristics of one or more predetermined AR graphics display surfaces. In one or more illustrative examples, the scores for the individual candidate objects may be used to rank the individual candidate objects with respect to one another.

In one or more additional examples, the surface detection system 422 may analyze additional input to identify AR graphics display surfaces. For example, the surface detection system 422 may analyze the camera data 418 in conjunction with data indicating a direction of a gaze of the user 404 to identify the AR graphics display surface 424. To illustrate, in situations where the surface detection system 422 analyzes the camera data 418 to determine a number of candidate AR graphics display surfaces, the surface detection system 422 may also analyze at least one of an orientation or a location of at least one of the camera 414 or the user device 402 to determine a direction of a gaze of the user 404. In various examples, the surface detection system 422 may determine a candidate AR graphics display surface that aligns with the gaze of the user 404 to identify the AR graphics display surface 424. In one or more further examples, the surface detection system 422 may identify the AR graphics display surface 424 based on input received from the user 404. In one or more examples, the AR graphics display surface 424 may appear in a user interface generated by the user device 402 in which a user interface element is present that may be actuated to select the AR graphics display surface 424.

The AR graphics system 416 may also include an object detection system 426 to analyze the camera data 418 to identify one or more additional objects included in the camera data 418. In one or more examples, the object detection system 426 may analyze the camera data 418 to identify a graphics input tool 428 within the field of view of the camera 414. The graphics input tool 428 may include a device that may be used to at least one of write, draw, or paint. In one or more illustrative examples, the graphics input tool 428 may include a paint brush. In at least some examples, paint is absent from the paint brush. In one or more additional examples, the graphics input tool 428 may include a stylus. In one or more further examples, the graphics input tool 428 may include a finger. Additionally, the object detection system 426 may analyze the camera data 418 to identify a tip 430 of the graphics input tool 428. Further, the object detection system 426 may analyze the camera data 418 to identify a hand 432 in the field of view of the camera 414. In one or more examples, the object detection system 426 may analyze the camera data 418 to identify a hand 432 that is holding the graphics input tool 428.

In one or more examples, the object detection system 426 may analyze the camera data 418 to determine at least one of a number of edges, a number of contours, or a number of shapes that may individually or in combination correspond to an object. In various examples, the object detection system 426 may determine one or more target regions that correspond to at least a portion of an object in a real-world scene. In at least some examples, the object detection system 426 may identify one or more objects in a scene based on an amount of similarity between features included in a target region and features of one or more objects included in template images. The template images may include images that were previously captured and include one or more objects of interest. The template images may be used for comparisons with subsequently captured images to identify objects of interest. In one or more illustrative examples, the object detection system 426 may implement one or more machine learning techniques to identify objects included in a scene, such as at least one of the graphics input tool 428, the tip 430 of the graphics input tool 428, or the hand 432. In one or more additional illustrative examples, the object detection system 426 may determine a group of pixels included in one or more images captured by the camera 414 that correspond to an object of interest, such as at least one of the graphics input tool 428, the tip 430 of the graphics input tool, or the hand 432.

Additionally, the AR graphics system 416 may include an object tracking system 434. The object tracking system 434 may analyze the camera data 418 determine a path of motion of one or more objects included in a field of view of the camera 414. For example, the object tracking system 434 may analyze the camera data 418 to determine a path of motion of at least one of the graphics input tool 428, the tip 430 of the graphics input tool 428, or the hand 432. The object tracking system 434 may determine a path of motion of an object of interest by analyzing the camera data 418 using one or more differential techniques to determine differences in position of objects between a number of images included in the camera data 418. In one or more additional examples, the object tracking system 434 may determine a path of motion of an object of interest by determining a background included in a number of images of the camera data 418 and determining changes in location of portions of the number of images that are not included in the background. In various examples, the object tracking system 434 may analyze intensities of pixels included in a number of images included in the camera data 418 to determine a path of motion of one or more objects of interest, such as at least one of the graphics input tool 428, the tip 430 of the graphics input tool, or the hand 432.

Further, the AR graphics system 416 may include an AR graphics display system 436. The AR graphics display system 436 may use data generated by at least one of the surface detection system 422, the object detection system 426, or the object tracking system 434 to generate AR graphics. In one or more examples, the AR graphics display system 436 may generate user interface data that corresponds to one or more user interfaces that include the AR graphics. In various example, the AR graphics generated by the AR graphics display system 436 may correspond to motion of at least one of the graphics input tool 428, the tip 430 of the graphics input tool 428, or the hand 432. In at least some examples, the AR graphics display system 436 may generate AR graphics that correspond to at least one of writing, drawing, painting, or another type of marking.

In one or more illustrative examples, the AR graphics display system 436 may determine a location for AR graphics to be displayed based on a location of the AR graphics display surface 424. In one or more examples, the surface detection system 422 may generate coordinates in real-world space that correspond to the AR graphics display surface 424 and provide the coordinates in real-world space to the AR graphics display system 436. In various examples, the coordinates in real-world space obtained by the AR graphics display system 436 may correspond to boundaries of the AR graphics display surface 424 and cause AR graphics to be generated and displayed within the boundaries of the AR graphics display surface 424. The AR graphics generated by the AR graphics display system 436 may be included in a user interface that is displayed as an overlay of the AR graphics display surface 424.

Additionally, the AR graphics display system 436 may obtain a path of motion of at least one of the graphics input tool 428, the tip 430 of the graphics input tool 428, or the hand 432 from the object tracking system 434. The AR graphics display system 436 may generate AR graphics that correspond to the path of motion of at least one of the graphics input tool 428, the tip 430 of the graphics input tool 428, or the hand 432. In one or more illustrative examples, as the tip 430 of the graphics input tool 428 moves within the boundaries of the AR graphics display surface 424, the AR graphics display system 436 may cause markings to be displayed within a user interface, where the markings correspond to the motion of the tip 430 of the graphics input tool 428. In this way, the AR graphics display system 436 may cause an AR graphic 438 to be displayed in a user interface that includes the AR graphics display surface 424.

The AR graphics generated by the AR graphics display system 436 may have one or more colors. In various examples, a color of a marking generated by the AR graphics display system 436 may be selected from a menu of colors based on input from the user 404. For example, the AR graphics display system 436 may generate a user interface that includes a menu including a number of user interface elements that correspond to different colors that may be used to generate AR graphics. In response to selection of a user interface element that corresponds to a given color, the AR graphics display system 436 may generate AR graphics having the selected color in accordance with motion of the tip 430 of the Graphics input tool 428.

The AR graphics display system 436 may also generate markings of AR graphics based on additional input provided by the user 404. For example, the AR graphics display system 436 may generate a user interface that includes a menu including a number of line widths. In these scenarios, the AR graphics display system 436 displays AR graphics comprised of one or more markings having widths selected by the user 404. In one or more additional examples, the widths of marking generated by the AR graphics display system 436 may be based on a state of the tip 430 of the Graphics input tool 428. To illustrate, as the tip 430 is bent to a greater extent, the thickness of a marking generated by the AR graphics display system 436 may increase. In one or more illustrative examples, the tip 430 may be associated with a first state that corresponds to a first amount of bending of the tip 430 and is related to a first marking width, a second state the corresponds to a second amount of bending of the tip 430 and is related to a second marking width, and a third state that corresponds to a third amount of bending of the tip 430 and is related to a third marking width. In various examples, the second amount of bending may be greater than the first amount of bending and the third amount of bending may be greater than the second amount of bending. In these instances, the second marking width may be thicker than the first marking width and the third marking width may be thicker than the second marking width.

In one or more examples, the AR graphics display system 436 may detect input indicating that at least a portion of the AR graphic 438 is to be erased. In addition, the AR graphics display system 436 may detect input to apply one or more additional augmented reality content items to a user interface including the AR graphic 438. For example, the AR graphics display system 436 may display a menu including a number of user interface elements that are selectable to execute one or more additional augmented reality content items. In various examples, the one or more additional augmented reality content items may cause an additional, predetermined graphic to be displayed in a user interface in conjunction with the AR graphic 438. Further, the one or more additional augmented reality content items may cause an animation to be displayed in a user interface in conjunction with the AR graphic 438.

In at least some examples, the AR graphics display system 436 may cause the AR graphic 438 to be saved in at least one of memory of the user device 402 or a data storage device that is remotely located with respect to the user device 402. The saved AR graphic 438 may be reproduced in response to detection of the AR graphics display surface 424. For example, the surface detection system 422 may determine that the AR graphics display surface 424 is no longer detected within the field of view of the camera 414. To illustrate, the user 404 may move at least a threshold distance away from the AR graphics display surface 424 or turn the user device 402 such that the camera 414 is no longer pointed in a manner that the AR graphics display surface 424 is within the field of view of the camera 414. In these situations, the AR graphic 438 is removed from a user interface displayed by the AR graphics display system 436. The surface detection system 422 may, at another time, determine that the AR graphics display surface 424 has returned to the field of view of the camera 414. As a result, the AR graphics display system 436 may cause the AR graphic 438 to be re-displayed in a user interface that includes the AR graphics display surface 424. In various examples, the AR graphics display system 436 may cause the AR graphic 438 to be displayed in a user interface in response to the surface detection system 422 determining that at least a minimum amount of the AR graphics display surface 424 is within the field of view of the camera 414.

In one or more additional examples, the AR graphics display system 436 may detect input to cause the AR graphic 438 to be displayed in a user interface that includes the AR graphics display surface 424. In one or more additional examples, the AR graphics display system 436 may detect input to display the AR graphic 438 on one or more additional surfaces. To illustrate, the user application 412 may cause a user interface to be displayed that includes a user interface element that is selectable to view one or more AR graphics generated using the user application 412. Individual AR graphics may be associated with one or more additional user interface elements that are selectable to cause the respective AR graphics to be displayed in a user interface that includes one or more surfaces located in a field of view of the camera 414. In various examples, the user application 412 may also generate one or more user interfaces that enable the user 404 to include the AR graphic 438 in one or more messages. The one or more messages may be sent to other users of the user application 412. In one or more further examples, the user application 412 may generate one or more user interfaces that enable the user 404 to share the AR graphic 438 with individuals included in a social network of the user 404. For example, the user application 412 may generate one or more user interfaces that include user interface elements that are selectable to enable the user 404 to include the AR graphic 438 in a social media post or story.

Figure 5:
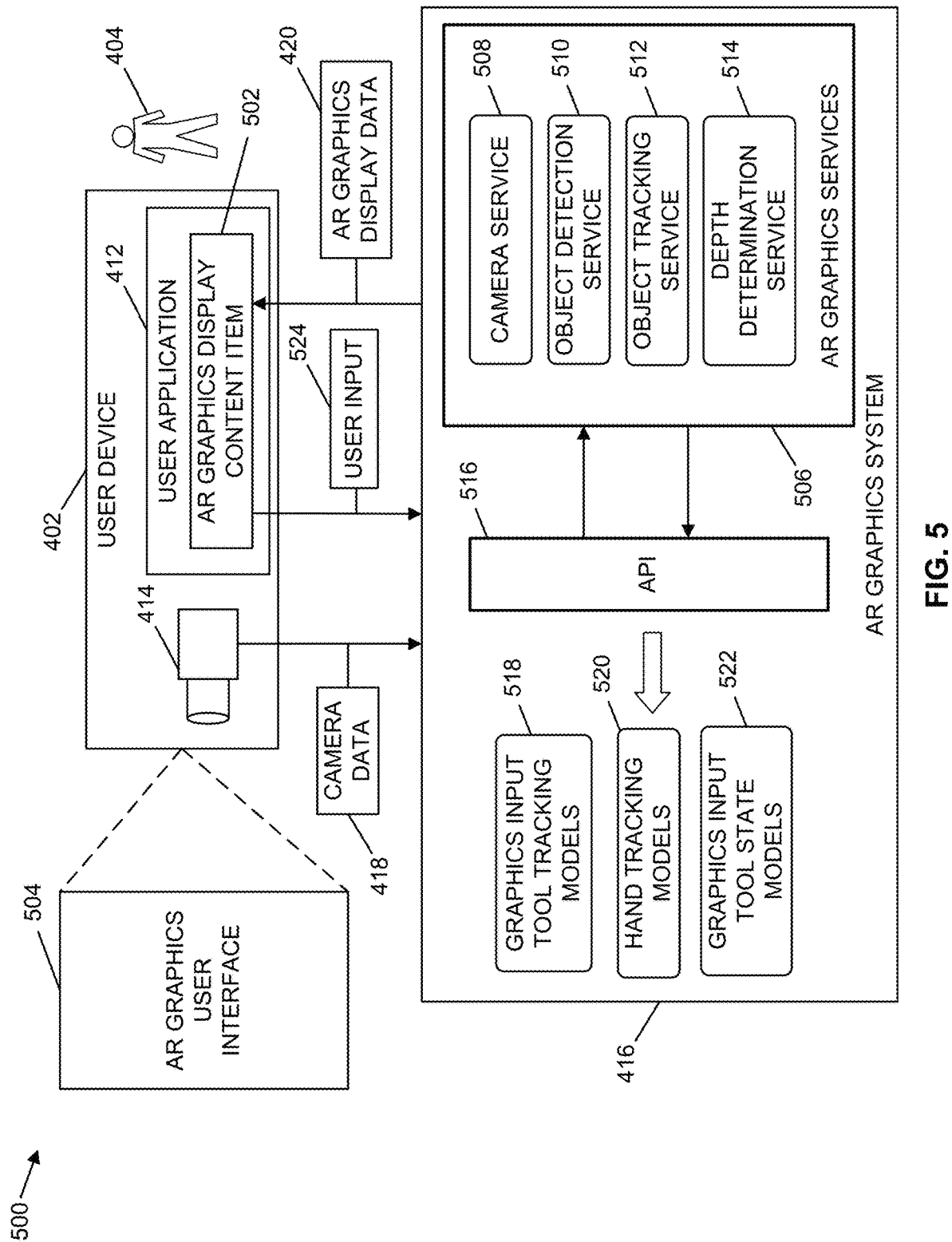
FIG. 5 is a diagram of an architecture including a number of computational components to generate user interfaces that display augmented reality graphics with respect to a surface based on detecting and tracking motion of a graphics input tool, in accordance with one or more examples.

FIG. 5 is a diagram of an architecture 500 including a number of computational components to generate user interfaces that display augmented reality graphics with respect to a surface based on detecting and tracking motion of a graphics input tool, in accordance with one or more examples. The architecture 500 may include the user device 402 that is operated by the user 404. The user device 402 may execute an instance of the user application 412. The user device 402 may also include the camera 414 that generates the camera data 418. The user device 402 may provide the camera data 418 to the AR graphics system 416. The AR graphics system 416 may analyze the camera data 418 to generate AR graphics display data 420. In various examples, at least a portion of the operations performed by the AR graphics system 416 may be performed by the user device 402. In one or more additional examples, at least a portion of the operations performed by the AR graphics system 416 may be performed by one or more additional computing devices that are located remotely with respect to the user device 402.

The AR graphics display data 420 may correspond to one or more AR graphics that are displayed within user interfaces generated by the user application 412. In one or more examples, the AR graphics display data 420 may be generated in conjunction with an AR graphics display content item 502. The AR graphics display content item 502 may include computer-readable code that is executable to activate features of the AR graphics system 416 to produce AR graphics that may be displayed in one or more user interfaces of the user application 412. For example, the AR graphics display content item 502 may be executable to cause AR graphics to be displayed in an AR graphics user interface 504. In one or more illustrative examples, the AR graphics display content item 502 may be executable to display AR graphics in the AR graphics user interface 504 as an overlay of one or more AR graphics display surfaces, such as the AR graphics display surface 424 of FIG. 4.

The AR graphics system 416 may include AR graphics services 506. The AR graphics services 506 may perform a number of computational operations to analyze the camera data 418 in order to generate the AR graphics display data 420. In at least some examples, the AR graphics services 506 may implement one or more machine learning technologies. In one or more examples, the AR graphics services 506 may be activated in response to activation of the AR graphics display content item 502.

The AR graphics services 506 may include a camera service 508 that obtains the camera data 418. For example, the camera service 508 may obtain a number of images captured by the camera 414, such as a number of video frames captured by the camera 414. In one or more examples, the camera service 508 may continuously receive the camera data 418 for a period of time. In various example, the camera services 508 may obtain the camera data 418 during a period of time that the AR graphics display content item 502 is activated. In one or more additional examples, the camera service 508 may be activated and deactivated in response to user input received via the AR graphics display content item 502. In at least some examples, the camera service 508 may make the camera data 418 available to one or more additional components of the AR graphics services 506.

The AR graphics services 506 may also include an object detection service 510. The object detection service 510 may obtain the camera data 418 from the camera service 508. In one or more examples, the object detection service 510 may analyze the camera data 418 to identify one or more objects in a real-world scene. The object detection service 510 may analyze the camera data 418 to identify at least a portion of a graphics input tool that may be used to generate markings that comprise an AR graphic displayed in the AR graphics user interface 504. The object detection service 510 may also analyze the camera data 418 to determine one or more AR graphics display surfaces within a real-world scene that corresponds to the camera data 418. Additionally, the object detection service 510 may analyze the camera data 418 to identify one or more additional objects included in a real-world scene, such as a hand of the user 404, a finger of the user 404, or a portion of an arm of the user 404.

In one or more examples, the object detection service 510 may implement one or more artificial neural networks to analyze the camera data 418 to identify objects within a real-world scene. For example, the object detection service 510 may implement one or more convolutional neural networks with respect to the camera data 418 to identify objects within a real-world scene. In addition, the object detection service 510 may implement one or more classification machine learning techniques to analyze the camera data 418 to identify one or more objects in a real-world scene. To illustrate, the object detection service 510 may implement one or more support vector machines with respect to the camera data 418 to identify one or more objects in a real-world scene.

In one or more illustrative examples, the object detection service 510 may analyze the camera data 418 to determine a number of at least one of contours, edges, or shapes that may be used to determine one or more candidate regions that may include one or more objects of interest, such as a graphics input tool, an AR graphics display surface, a tip of the graphics input tool, a finger, or one or more combinations thereof. The object detection service 510 may also implement a convolutional neural network to extract features from the one or more candidate regions. Additionally, the object detection service 510 may implement one or more support vector machines to classify one or more objects included in the one or more candidate regions based on the features extracted from the one or more candidate regions by the convolutional neural network. In various examples, the one or more machine learning techniques implemented by the object detection service 510 may be training using previously captured images that include one or more of the objects of interest and are labeled as including the one or more objects of interest.

The AR graphics services 506 may also include an object tracking service 512 that may detect movement of one or more of the objects of interest identified by the object detection service 510. In one or more examples, the object tracking service 512 may implement one or more trackers that determine movement of one or more of the objects of interest within frames of the camera data 418. In various example, the object tracking service 512 may label an object of interest as an object to be tracked and determine differences in location of the labeled object of interest within a number of video frames. In one or more illustrative examples, the object tracking service 512 may implement one or more of convolutional neural networks, recurrent neural networks, autoencoders, or generative adversarial networks to track the motion of objects of interest across video frames.

Additionally, the AR graphics services 506 may include a depth determination service 514 that determines a distance between one or more objects included in the camera data 418 and the camera 414. In various examples, the depth determination service 514 may determine coordinates in real world space for one or more objects included in a real-world scene that corresponds to the camera data 418. In one or more illustrative example, the depth determination service 514 may use data obtained from multiple cameras of the user device 402 to determine the coordinates in real world space. In one or more additional illustrative examples, the depth determination service 514 may implement one or more convolutional neural networks to determine coordinates in real world space for one or more objects of interest include in the camera data 418. The one or more convolutional neural networks may be trained using images including objects that have been labeled as being various distances from the one or more cameras that captured the training images.

Further, the AR graphics system 416 may implement an application programming interface (API) 516. The API 516 may include a number of calls that may be used to obtain information generated by the AR graphics services 506. For example, one or more first calls of the API 516 can be provided to obtain information from the camera service 508. In addition, one or more second calls of the API 516 can be provided to obtain information from the object detection service 510. Further, one or more third calls of the API 516 can be provided to obtain information from the object tracking service 512. In various examples, one or more fourth calls of the API 516 calls may be provided to obtain information from the depth determination service 514.

In the illustrative example of FIG. 5, calls of the API 516 may be used to provide information generated by the AR graphics services 506 to one or more computational models. For example, the AR graphics system 416 may include one or more graphics input tool tracking models 518. In one or more examples, the graphics input tool tracking models 518 may be implemented to determine a location of a graphics input tool with respect to an AR graphics display surface. In various examples, the one or more graphics input tool tracking models 518 may use one or more calls of the API 516 to obtain information from the object detection service 510 and the object tracking service 512 to track the location of the graphics input tool with respect to the AR graphics display surface. The one or more graphics input tool tracking models 518 may use the location of the graphics input tool to determine locations of markings of an AR graphic to be displayed in the AR graphics user interface 504 with respect to the AR graphics display surface.

In addition, the AR graphics system 416 may include one or more hand tracking models 520. The one or more hand tracking models 520 may be implemented to determine a location of a hand of users of graphic input tools. The one or more hand tracking models 520 may use one or more calls of the API 516 to obtain information from the object detection service 510 and the object tracking service 512 to track the location of a hand of the user 404 that is holding a graphics input tool, such as a paint brush, a stylus, another marking implement, and the like. By tracking the movement of a hand of the user 404 that is holding a graphics input tool, additional information may be obtained to improve the accuracy of the location of markings formed in response to motion of the graphics input tool held by the hand of the user 404. For example, not only may the accuracy of the location of the graphics input tool be increased by detecting and tracking the motion of the hand of the user 404 that is holding the graphics input tool, but the angle at which the graphics input tool is being held may have an effect on the appearance of markings generated in response to motion of the graphics input tool and in response to motion of the hand of the user 404.

Further, the AR graphics system 416 may include one or more graphics input tool state models 522. The one or more graphics input tool state models 522 may be implemented to determine a state of the graphics input tool used to generate markings displayed in the AR graphics user interface 504 with respect to an AR graphics display surface. The state of the graphics input tool may impact characteristics of the markings produced in response to motion of the graphics input tool. The state of the graphics input tool may also correspond to whether or not marking functionality of the AR graphics display content item 502 has been activated. In various examples, the one or more graphics input tool state models 522 may use one or more calls of the API 516 to obtain information from the object detection service 510, the object tracking service 512, and the depth determination service 514.

For example, the graphics input tool may include a paint brush and an amount of bending of the tip of the paint brush may correspond to a width of markings displayed in response to motion of the graphics input tool. The one or more graphics input tool state models 522 may obtain information from at least one of the object detection service 510 or the depth determination service 514 to determine an amount of bending of the tip of the paint brush in response to contact with the AR graphics display surface. In at least some examples, one or more first amounts of bending of the tip of the paint brush may correspond to one or more first widths of markings displayed in the AR graphics user interface 504, one or more second amounts of bending of the tip of the paint brush may correspond to one or more second widths of markings displayed in the AR graphics user interface 504, and one or more third amounts of bending of the tip of the paint brush may correspond to one or more third widths of marking displayed in the AR graphics user interface 504. In this way, as the graphics input tool moves in conjunction with the AR graphics display surface, markings may be displayed in the AR graphics user interface 504 based on the state of the paint brush determined using the one or more graphics input tool state models 522.

In various examples, the one or more graphics input tool state models 522 may use information obtained from at least one of the object detection service 510, the object tracking service 512, or the depth determination service 514 to determine whether the graphics input tool is within a threshold distance of an AR graphics display surface. For example, the one or more graphics input tool state models 522 may be implemented to determine that a paint brush is within a threshold distance of a wall that comprises an AR graphics display surface. In one or more illustrative examples, the one or more graphics input tool state models 522 may be implemented to determine that the paint brush is touching the wall. In one or more examples, when the graphics input tool is within the threshold distance of the AR graphics display surface, marking functionality of the graphics input tool may be in an activated state. In response to the graphics input tool being in an active state, markings may be generated within the AR graphics user interface 504 based on motion of the graphics input tool. In scenarios where the graphics display tool is greater than the threshold distance from the AR graphics display surface, the graphics input tool is in a deactivated state. In response to the graphics input tool being in the deactivated state, motion of the graphics input tool may not result in markings being generated in the AR graphics user interface 504. In one or more illustrative examples, the threshold distance may be no greater than 50 mm, no greater than 40 mm, no greater than 30 mm, no greater than 20 mm, no greater than 10 mm, no greater than 5 mm, or no greater than 1 mm.

Although the one or more graphics input tool tracking models 518, the one or more hand tracking models 520, and the one or more graphics input tool state models 522 are included in the AR graphics system 416 and shown separate from the user device 402 in the illustrative example of FIG. 5, in one or more implementations, at least a portion of the operations performed by the one or more graphics input tool tracking models 518, the one or more hand tracking models 520, the one or more graphics input tool state models 522, or one more combinations thereof, may be performed by the user device 402. In various examples, the architecture 500 is arranged with the use of the API 516 by the models 518, 520, 522 to access information from the AR graphics services 506 in order to minimize the computing resources and memory resources utilized by the user device 402 to generate the AR graphics user interface 504. That is, since the user device 402 may include a head-worn device or a wearable device having limited processing resources and memory resources, at least a portion of the operations performed with respect to the AR graphics display content item 502 to generate the AR graphics user interface 504 may be performed using computing resources and memory resources located remotely from the user device 402 using one or more calls of the API 516. In one or more illustrative examples, at least one of the one or more graphics input tool tracking models 518, the one or more hand tracking models 520, and the one or more graphics input tool state models 522 may be stored in memory of the user device 402 while the AR graphics services 506 are stored and executed using computing resources and memory resources located remotely with respect to the user device 402. In these scenarios, calls of the API 516 are used to obtain information from the AR graphics services 506 that is utilized by at least one of the one or more graphics input tool tracking models 518, the one or more hand tracking models 520, or the one or more graphic input tool state models 522 to generate AR graphics within the AR graphics user interface 504. In one or more further examples, the surface detection system 422, the object detection system 426, the object tracking system 434, and the AR graphics display system 436 may include and/or implement components of the AR graphics services 506, the API 516, the graphics input tool tracking models 518, the one or more hand tracking models 520, and the one or more graphics input tool state models 522.

In one or more examples, the AR graphics system 416 may obtain user input 524. The user input 524 may be generated in response to actions taken by the user 404 with a graphics input tool. In various examples, one or more menus may be displayed in conjunction with the AR graphics user interface 504. In these scenarios, the user input 524 corresponds to selections from the one or more menus. The one or more menus may be displayed in the AR graphics user interface 504 as overlays of an AR graphics display surface. In one or more illustrative examples, the one or more menus may include a number of graphical user interface elements that are selectable to activate one or more functions of the AR graphics display content item 502. For example, one or more user interface elements of the one or more menus may be selectable to cause markings produced in the AR graphics user interface 504 to have a specified color. In addition, one or more user interface elements of the one or more menus may be selectable to generate markings having a specified width in the AR graphics user interface 504. In one or more further examples, one or more user interface elements of the one or more menus may be selectable to cause one or more additional AR content items to be executed with respect to one or more objects included in the AR graphics user interface 504.

In at least some examples, the function corresponding to a given user interface element may be activated in response to determining that a graphics input tool is within a threshold distance of the user interface element displayed in the AR graphics user interface 504 as an overlay of the AR graphics display surface. In one or more illustrative examples, an appearance of a user interface element may be modified in response to selection of the user interface element in response to user input 524. To illustrate, a user interface element that corresponds to generating markings having a given color may be displayed as having the given color and may become a brighter shade of the color in response to selection based on the user input 524. In one or more additional illustrative examples, a mesh collider may be generated for individual user interface elements and user input 524 indicated by contact between an input device, such as a finger, stylus, or graphics input tool, with the mesh collider may activate the function corresponding to the individual user interface element.

Figure 6:
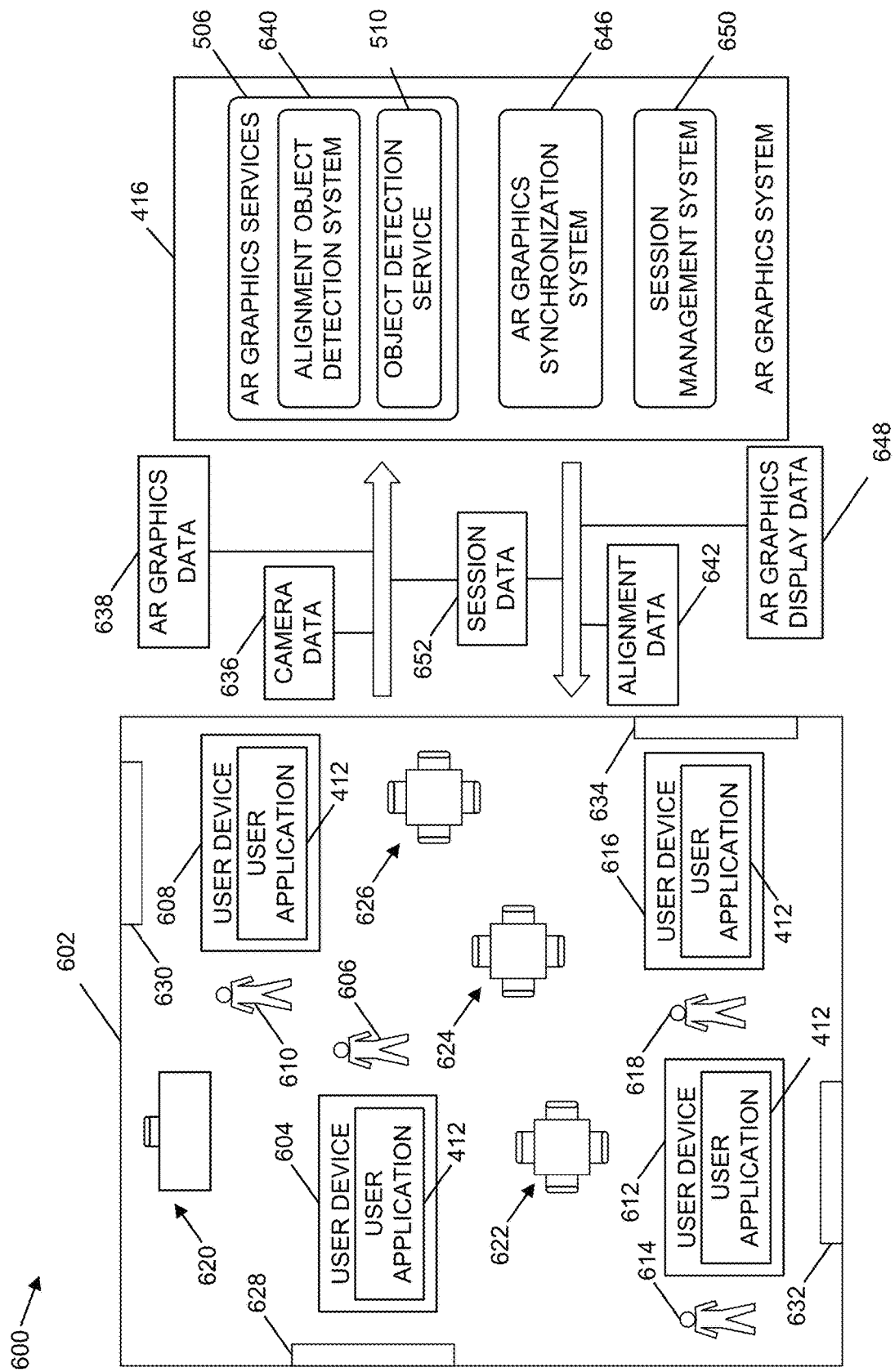
FIG. 6 is a diagram of an architecture to generate and display AR graphics according to input provided by a plurality of users in an environment, in accordance with one or more examples.

FIG. 6 is a diagram of an architecture 600 to generate and display AR graphics according to input provided by a plurality of users in an environment 602, in accordance with one or more examples. The environment 602 may comprise a room, a portion of a room, a building, a portion of a building, an indoor space, an outdoor space, one or more combinations thereof, and the like. The environment 602 may include one or more boundaries, such as one or more walls and/or one or more partitions. The environment 602 may also include one or more doors, one or more doorways, one or more entrances, one or more exits, one or more windows, one or more combinations thereof, and so forth.

The architecture 600 may include a number of user devices and the AR graphics system 416. For example, the architecture 600 may include a first user device 604 operated by a first user 606, a second user device 608 operated by a second user 610, a third user device 612 operated by a third user 614, and a fourth user device 616 operated by a fourth user 618. The user devices 604, 608, 612, 616 may execute an instance of the user application 412. The user devices 604, 608, 612, 616 may include one or more cameras to capture images of the environment 602. The user devices 604, 608, 612, 616 may include a number of computing devices having processing resources and memory resources. For example, the user devices 604, 608, 612, 616 may include at least one of a head-worn device, a wearable device, or a mobile computing device, such as a smart phone. In various examples, the user devices 604, 608, 612, 616 may include multiple computing devices that operate in conjunction with one another. To illustrate, the user devices 604, 608, 612, 616 may include a head-worn device that operates in conjunction with at least one of a wearable device or a mobile computing device. In one or more additional examples, the user devices 604, 608, 612, 616 may include a wearable device that operates in conjunction with a mobile computing device. In one or more illustrative examples, the user devices 604, 608, 612, 616 may include the glasses 100 of FIG. 1.

The environment 602 may include a number of objects. For example, the environment 602 may include one or more first objects 620, one or more second objects 622, one or more third objects 624, and one or more fourth objects 626. In one or more examples, the environment 602 may comprise a classroom. In these scenarios, the one or more first objects 620 include at least one of a teach desk or teacher chair. Additionally, the one or more second objects 622, the one or more third objects 624, and the one or more fourth objects 626 include at least one of student desks or student chairs.

Additionally, the environment 602 may include a number of AR graphics display surfaces. For example, the environment 602 includes a first AR graphics display surface 628, a second AR graphics display surface 630, a third AR graphics display surface 632, and a fourth AR graphics display surface 634. The AR graphics display surfaces 628, 630, 632, 634 may include a portion of a wall. In one or more additional examples, the AR graphics display surface 628, 630, 632, 634 may include a screen affixed to a wall of the environment 602. In various examples, user interfaces including AR graphics may be displayed on the AR graphics display surfaces 628, 630, 632, 634.

Cameras of the user devices 604, 608, 612, 616 may capture at least one of image content or video content within a field of view of the cameras. The user devices 604, 608, 612, 616 may generate camera data 636 based on the content captured by the cameras of the user devices 604, 608, 612, 616. The camera data 636 may be accessible to the AR graphics system 416. In one or more examples, at least a portion of the user devices 604, 608, 612, 616 may also provide AR graphics data 638 to the AR graphics system 416. The AR graphics data 638 may correspond to input captured by at least a portion of the user devices 604, 608, 612, 616 that indicates motion of Graphics input tools by one or more users 606, 610, 614, 618 in relation to one or more of the AR graphics display surfaces 628, 630, 632, 634. In various examples, the AR graphics data 638 may correspond to AR graphics generated according to the motion of one or more Graphics input tools captured by cameras of one or more user devices 604, 608, 612, 616 during execution of an AR graphics display content item within the user application 412.

The AR graphics services 506 may include an alignment object detection system 640 to determine an alignment object located in the environment 602 that may be used to determine an origin for a real-world coordinate system that corresponds to the environment 602. The real-world coordinate system may use coordinates to determine positions of points within the environment 602. The real-world coordinate system may correspond to two-dimensional space within the environment 602 or a three-dimensional space within the environment 602. In one or more illustrative examples, the alignment object detection system 640 may be invoked using calls of an API, such as the API 516 described in relation to FIG. 5.

In one or more examples, the alignment object detection system 640 may generate one or more three-dimensional (3D) depth maps based on the camera data 636. In various examples, the alignment object detection system 640 may implement one or more laser imaging, detection, and ranging (LiDAR) techniques to generate the 3D depth maps based on the camera data 636. Additionally, the alignment object detection system 640 may implement one or more time-of-flight techniques to generate the 3D depth maps using the camera data 636. Further, the alignment object detection system 640 may implement one or more least squares error methods to generate the 3D depth maps based on the camera data 636. In still other examples, the alignment object detection system 640 may implement one or more plane sweeping techniques to generate the 3D depth maps based on the camera data 636. The alignment object detection system 640 may also implement one or more epipolar-plane methods to generate the 3D depth maps using the camera data 636.

The alignment object detection system 640 may analyze depth maps generated using the camera data 636 to determine one or more candidate alignment objects located in the environment 602 that may be used as a landmark or as an origin for a real-world coordinate system that corresponds to the environment 602. In various examples, the alignment object detection system 640 may analyze depth maps based on the camera data 636 in relation to one or more predefined characteristics to determine one or more candidate alignment objects located in the environment 602. For example, the alignment object detection system 640 may analyze data that corresponds to objects located in the environment 602 according to locations, sizes, shapes, textures, colors, edges, contours, one or more combinations thereof, and the like, to determine at least one candidate alignment object located in the environment 602. In one or more additional examples, the alignment object detection system 640 may analyze changes in location of one or more objects within the environment 602 during a period of time to determine one or more candidate alignment objects that may be located in the environment 602.

In at least some examples, the characteristics of objects that may be designated as alignment objects may be based on the location of the environment 602. For example, in situations where the environment 602 is located in an educational setting, a first set of characteristics is used by the alignment object detection system 640 to identify one or more candidate alignment objects located in the environment 602. Further, in scenarios where the environment 602 is located in a residence, a second set of characteristics is used by the alignment object detection system 640 to identify one or more candidate alignment object located in the environment 602. In still other examples, the environment 602 may be located in a place of business and the alignment object detection system 640 analyzes a third set of characteristics to determine one or more candidate alignment objects located in the environment 602. In various examples, the characteristics analyzed by the alignment object detection system 640 to identify one or more candidate alignment objects located in the environment 602 may be based on a type of business that corresponds to the environment 602, such as a retail business, a restaurant, an office building, a healthcare facility, and the like. In at least some examples, a set of characteristics used to identify alignment objects in a given environment may be different from an additional set of characteristics used to identify alignment objects in another environment.

In various examples, the alignment object detection system 640 may analyze the camera data 636 and/or one or more depth maps generated based on the camera data 636 to determine characteristics of one or more objects located in the environment 602. The alignment object detection system 640 may determine, based on the characteristics of objects included in the environment 602, one or more candidate alignment objects that may correspond to an origin of a real-world coordinate system that corresponds to the environment 602. In one or more illustrative examples, the alignment object detection system 640 determines a measure of similarity between characteristics of objects included in the environment 602 and characteristics of target objects that have previously been designated as alignment objects in at least one of the environment 602 or in one or more additional environments. In scenarios where the measure of similarity is at least a threshold measure of similarity, the alignment object detection system 640 determines that an object located in the environment 602 is designated as an alignment object and may be considered an origin for a real-world coordinate system that corresponds to the environment 602.

In one or more examples, the alignment object detection system 640 may analyze images of a number of objects previously designated as alignment objects to determine an alignment object located in the environment 602. In at least some examples, the alignment object detection system 640 may operate in conjunction with the object detection service 510 to identify at least one of objects or characteristics of objects located in the environment 602. The alignment object detection system 640 may then analyze characteristics of objects located in the environment 602 in relation to characteristics of objects previously determined to be alignment objects to identify one or more objects located in the environment 602 as alignment objects. In one or more additional examples, the alignment object detection system 640 may implement one or more machine learning techniques to analyze characteristics of objects identified using the camera data 636 to determine one or more objects located in the environment 602 that may be designated as an alignment object for the environment 602. For example, the alignment object detection system 640 may implement one or more artificial neural networks, such as at least one of one or more convolutional neural networks or one or more residual neural networks, to analyze characteristics of objects located in the environment 602 in relation to characteristics of objects previously designated as alignment objects to determine one or more alignment objects located in the environment 602. In one or more further examples, the alignment object detection system 640 may implement one or more generative adversarial networks to analyze characteristics of objects located in the environment 602 in relation to characteristics of objects previously designated as alignment objects to identify one or more alignment objects located in the environment 602.

In one or more illustrative examples, the environment 602 corresponds to a classroom, the one or more first objects 620 correspond to a desk of an instructor, and the one or more second objects 622, the one or more third objects 624, and the one or more fourth objects 626 each correspond to at least one of student desks, student tables, or student chairs. In these scenarios, the camera data 636 includes images of the one or more first objects 620, the one or more second objects 622, the one or more third objects 624, and the one or more fourth objects 626 that are analyzed by the alignment object detection system 640. In various examples, the alignment object detection system 640 may determine that a teacher desk included in the one or more first objects 620 is an alignment object for the environment 602. In various examples, the alignment object detection system 640 may determine that a teacher desk included in the one or more first objects 620 corresponds to an alignment object for the environment 602 based on characteristics of the teacher desk having at least a threshold amount of similarity with one or more additional characteristics, such as contours, shapes, edges, colors, textures, sizes, and so forth, of one or more additional objects that have previously been identified as alignment objects. In one or more additional examples, the alignment object detection system 640 may determine that a teacher desk included in the one or more first objects 620 is an alignment object based on a lack of movement of the teacher desk over a period of time and/or based on a probability of movement of the teacher desk being less than a threshold probability.

In response to determining an alignment object in the environment 602, the alignment object detection system 640 may send alignment data 642 to one or more user devices located in the environment 602. For example, the alignment object detection system 640 may send the alignment data 642 to at least one of the first user device 604, the second user device 608, the third user device 612, or the fourth user device 616. In one or more examples, the alignment data 642 may indicate characteristics of the alignment object. In one or more additional examples, the alignment data 642 may indicate a location of the alignment object within the environment 602. In one or more further examples, the alignment data 642 may indicate an origin of a real-world coordinate system for the environment 602, where the origin corresponds to a location of the alignment object. By determining an alignment object for the environment 602, the display of augmented reality graphics generated based on input from one or more users of the user devices 604, 608, 612, 616 is synchronized, such that users of one or more of the user devices 604, 608, 612, 616 may view augmented reality graphics generated by other users of one or more of the user devices 604, 608, 612, 616 in the locations where the respective users created the augmented reality graphics.

In one or more examples, at least a portion of the user devices 604, 608, 612, 616 may generate augmented reality graphics in response to capturing user input corresponding to motion of a graphics input tool with respect to an AR graphics display surface. For example, motion of a graphics input tool may be captured by cameras of one or more of the user devices 604, 608, 612, 616 and augmented reality graphics may be generated based on the user input. The user devices 604, 608, 612, 616 may send AR graphics data 638 to the AR graphics system 416 that includes at least one of image content or video content of the user input corresponding to the motion of an AR graphics display tool by one or more of the users 606, 610, 614, 618.

The AR graphics system 416 may include an AR graphics synchronization system 646 that coordinates the display of augmented reality graphics generated based on input made by at least a portion of the users 606, 610, 614, 618. In one or more examples, the AR graphics synchronization system 646 may use the AR graphics data 638 and the origin of the real-world coordinate system for the environment 602 determined by the alignment object detection system 640 to generate AR graphics display data 648. In various examples, the AR graphics display data 648 may indicate a location of augmented reality graphics generated based on input by at least a portion of the users 606, 610, 614, 618 within the environment 602. To illustrate, the AR graphics synchronization system 646 may generate coordinates in a real-world coordinate system corresponding to the environment 602 that indicate locations of augmented reality graphics generated by at least a portion of the users 606, 610, 614, 618. Additionally, the AR graphics synchronization system 646 may analyze at least one of the camera data 636 or other sensor data obtained from the user devices 604, 608, 612, 616 to determine coordinates of a real-world coordinate system that corresponds to the field of view of one or more cameras of the user devices 604, 608, 612, 616. In these scenarios, as the field of view of a user device 604, 608, 612, 616 corresponds to the coordinates of an augmented reality graphic, the AR graphics synchronization system 646 causes an augmented reality graphic to be displayed at the respective coordinates. In at least some examples, the AR graphics synchronization system 646 may send AR graphics display data 648 to one or more of the user devices 604, 608, 612, 616 that includes at least one of locations of one or more augmented reality graphics or characteristics of the augmented reality graphics such that the one or more user devices 604, 608, 612, 616 may generate one or more user interfaces that display the augmented reality graphics at the respective locations associated with the augmented reality graphics. In one or more examples, the characteristics of the augmented reality graphics may include shapes, textures, edges, colors, contours, one or more combinations thereof, and the like. In one or more instances, the augmented reality graphics may be displayed as overlays of a real-world scene that includes an AR graphics display surface 628, 630, 632, 634.

In one or more illustrative examples, the first user 606 moves a graphics input tool in relation to the first AR display surface 628. A camera of the first user device 604 may capture at least one of image content or video content indicating the motion of the Graphics input tool and additional input related to augmented reality graphics, such as input indicating selections of color, line width, shapes, one or more combinations thereof, and the like, and send the video content and additional input to the AR graphics system 416 as AR graphics data 638. The AR graphics synchronization system 646 may determine a location of the augmented reality graphic that corresponds to the AR graphics data 638 based on an alignment object, such as a teacher desk included in the one or more first objects 620, that is designated as an origin of a real-world coordinate system that corresponds to the environment 602. The AR graphics synchronization system 646 may also monitor objects detected in the field of view of the cameras of the user devices 608, 612, 616. In various examples, the AR graphics synchronization system 646 may determine a measure of similarity between the real-world coordinates of a field of view of user devices 608, 612, 616 in relation to real-world coordinates of the augmented reality graphic created by the first user 606. The AR graphics synchronization system 646 may determine that the field of view of at least one user device 608, 612, 616 corresponds to the location of the augmented reality graphic when the measure of similarity has at least a threshold value. In response to determining that the field of view of a camera of at least one of the user devices 608, 612, 616 corresponds to the location of the augmented reality graphic created by the first user, the AR graphics synchronization system 646 may cause a user interface to be displayed that includes the augmented reality graphic and is viewable using the at least one user device 608, 612, 616 having a field of view that corresponds to the location of the augmented reality graphic.

In one or more examples, augmented reality graphics may be viewed by a number of users that are participating in an AR graphics creation session. The AR graphics creation session may be initiated by one of the users located in the environment 602. In at least some examples, a user initiating an AR graphics creation session may be designated as a leader or primary user of the AR graphics session. In various examples, an AR graphics creation session may be initiated via an instance of an augmented reality graphics content item that is executing within the user application 412. In one or more instances, an AR graphics creation session is initiated based on user input corresponding to selection of one or more user interface elements to cause an AR graphics creation session to be initiated.

The AR graphics system 416 may include a session management system 650 to initiate, control, and/or administer AR graphics creation sessions. The session management system 650 may receive requests to initiate AR graphics creation sessions and enable users to join and leave AR graphics creation sessions. In various examples, users that have joined a same AR graphics creation session may view the AR graphics created by other users included in the AR graphics creation session. The users that have joined an AR graphics creation session may view AR graphics created by themselves or other users as part of the AR graphics creation session via user interfaces generated by the user devices 604, 608, 612, 616. The session management system 650 may also operate in conjunction with the AR graphics synchronization system 646 to resolve conflicts between user inputs that may result in the creation of multiple versions of an AR graphic.

In one or more examples, the session management system 650 may receive a request from a user device located in the environment 602 to initiate an AR graphics creation session. In response to receiving the request to initiate the AR graphics creation session, the session management system 650 generates a session identifier that corresponds to an AR graphics creation session. In at least some examples, the session identifier may uniquely identify the AR graphics creation session. The session management system 650 may send the session identifier to the user device that requested the creation of the AR graphics creation session as session data 652. In various examples, the user device and the corresponding user that requested the initiation of the AR graphics creation session may be designated by the session management system 650 as a primary user/primary user device or a lead user/lead user device for the AR graphics creation session.

A primary user may send one or more requests to additional users via the session management system 650 to join an AR graphics creation session. In one or more examples, a request to invite one or more additional users to join an AR graphics creation session may indicate one or more identifiers of the one or more additional users. For example, a request to invite a number of additional users to join an AR graphics creation session may include an identifier of each of the one or more additional users. In one or more additional examples, a request to invite a number of additional users to join an AR graphics creation session may include an identifier of a group of users, such as a group of students included in an educational class.

In response to receiving a request to invite additional users to an AR graphics creation session, the session management system 650 may send invitations to join the AR graphics creation session to the additional users that correspond to the one or more identifiers included in the request. In various examples, the invitation may include a notification that is displayed by one or more user interfaces of the user application 412. In one or more illustrative examples, the session management system 650 may send a message to one or more additional users that includes an invitation to join the AR graphics creation session. The message may be communicated within the user application, via text message, via video message, via audio message, via email, one or more combinations thereof, and the like. In at least some examples, an invitation to join an AR graphics creation session may include one or more user interface elements that are selectable to cause an additional user to become a participant in an AR graphics creation session. In one or more further examples, an invitation to join an AR graphics creation session may include a link that is selectable to display one or more user interfaces that enable an additional user to join an AR graphics creation session. The session management system 650 may receive user input indicating acceptance of one or more additional users to join an AR graphics creation session. In these scenarios, the session management system 650 adds the one or more additional users to the AR graphics creation session and send an identifier of the AR graphics creation session to the one or more user devices associated with the one or more additional users. In at least some examples, the session management system 650 may generate a list of users that have joined a given AR graphics creation session.

After users have joined an AR graphics creation session, AR graphics data 638 generated in response to user input indicating motion of a graphics input tool is sent to the AR graphics system 416 with the identifier of the AR graphics creation session. In this way, the session management system 650 identifies AR graphics data 638 that corresponds to individual AR content creation sessions and causes the AR graphics created by the users participating in an AR graphics creation session to be viewable by other users of the AR graphics creation session. In one or more examples, the session management system 650 may send AR graphics display data 648 to users included in an AR graphics creation session that corresponds to features of AR graphics created by each of the users.

In one or more illustrative examples, for individual users included in an AR graphics creation session, the session management system 650 may cause AR graphics data 638 generated in response to input of the individual users to be stored in a specified storage location and/or in conjunction with the identifier of the AR graphics creation session. As a result, the session management system 650 and/or the AR graphics synchronization system 646 may retrieve data that corresponds to AR graphics created by users included in an AR graphics creation session in response to determining that one or more users of the AR graphics creation session are viewing a location of the environment 602 that corresponds to the location of the AR graphics. For example, the session management system 650 may cause characteristics of AR graphics created by individual users of an AR graphics creation session to be stored in a data repository accessible to the AR graphics system 416 in association with an identifier of the AR graphics creation session. The session management system 650 may also cause a location in the environment 602 of AR graphics created by individual users of an AR graphics creation session to be stored in the storage location that corresponds to the AR graphics creation session. The location of an AR graphic in the environment 602 may include real-world coordinates that correspond to user input indicating motion of a graphics input tool within the environment 602. The real-world coordinates that indicate the location of AR graphics may be aligned around an origin located in the environment 602 that corresponds to an alignment object located in the environment 602. In one or more additional illustrative examples, the location of an AR graphic may correspond to a location of an AR graphics display surface, such as at least one of AR graphics display surfaces 628, 630, 632, 634.

In various examples, the AR graphics synchronization system 646 may operate in conjunction with the session management system 650 to cause user interfaces to be displayed that include AR graphics created by users of an AR graphics creation session that takes place in the environment 602. To illustrate, the AR graphics synchronization system 646 may analyze camera data 636 received by the AR graphics system 416 from one or more user devices 604, 608, 612, 616 that corresponds to an identifier of an AR graphics creation session determined by the session management system 650. In at least some examples, in response to joining and/or initiating an AR graphics creation session, the user devices 604, 608, 612, 616 may include an identifier of the AR content creation session in the camera data 636 generated during the AR content creation session that is sent to the AR graphics system 416. In this way, the AR graphics synchronization system 646 monitors and analyzes camera data 636 for individual AR graphics creation sessions. The AR graphics synchronization system 646 may analyze the camera data 636 to determine a location of a field of view of the user devices 604, 608, 612, 616. For example, the AR graphics synchronization system 646 may determine a location of a field of view of one or more user devices 604, 608, 612, 616 by analyzing at least one of one or more objects, one or more textures, one or more colors, one or more shades, one or more contours, one or more edges, or one or more surfaces included in the camera data 636 obtained from a respective user device 604, 608, 612, 616. Additionally, the AR graphics synchronization system 646 may determine a location of a field of view of a user device 604, 608, 612, 616 by analyzing additional sensor data obtained from the user device 604, 608, 612, 616, such as one or more motion sensors, one or more inertial measurement unit sensors, geographic positioning system (GPS) data, one or more accelerometers, one or more gravity sensors, one or more combinations thereof, and the like. The location of a field of view of a user device 604, 608, 612, 616 may include real-world coordinates aligned around an origin that corresponds to an alignment object located in the environment 602.

The AR graphics synchronization system 646 may analyze a location of a field of view of a user device 604, 608, 612, 616 in relation to one or more locations of one or more AR graphics. In one or more examples, the AR graphics synchronization system 646 may determine that a location of a field of view of at least one user device 604, 608, 612, 616 corresponds to a location of at least a portion of an AR graphic located in the environment 602. In these scenarios, the AR graphics synchronization system 646 may determine characteristics of the AR graphic or a portion of the AR graphic and send AR graphics display data 648 to one or more user devices 604, 608, 612, 616 that corresponds to the characteristics of the AR graphic or the portion of the AR graphic. In response, the one or more user devices 604, 608, 612, 616 may use the AR graphics display data 648 to generate one or more user interfaces that include the AR graphic or the portion of the AR graphic as an overlay of a real-world scene.

In various examples, the AR graphics synchronization system 646 may operate in conjunction with the session management system 650 to resolve conflicts that may arise when input to create AR graphics that is provided by multiple users overlap. That is, the AR graphics synchronization system 646 may operate in conjunction with the session management system 650 to determine a primary version of an AR graphic that is to be displayed to users included in an AR graphics creation session in situations where multiple versions of the AR graphic may be created. In one or more examples, at least two of the users 606, 610, 614, 618 may move graphics input tools in relation to a same AR graphics display surface 628, 630, 632, or 634 in conjunction with an AR graphics creation session. AR graphics may be generated in response to the motion of the graphics input tools by each of the users in relation to a physical surface included in the environment 600 that corresponds to an AR graphics display surface 628, 630, 632, or 634.

In at least some examples, the AR graphics synchronization system 646 may determine that the location of a first AR graphic created by the first user 606 overlaps with a location of a second AR graphic created by the second user 610. To illustrate, the AR graphics synchronization system 646 may analyze real-world coordinates of the first AR graphic in relation to real-world coordinates of the second AR graphic and determine that the location of at least a portion of the first AR graphic overlaps with the location of at least a portion of the second AR graphic. In one or more scenarios, the second AR graphic may be an extension of the first AR graphic or separate from the first AR graphic. In one or more examples, the first AR graphic may correspond to a first version of an AR graphic and the combination of the first AR graphic with at least a portion of the second AR graphic may correspond to a second version of the AR graphic.

The AR graphics synchronization system 646 may implement one or more schemes, rules, or frameworks to determine whether the first version of the AR graphic or the second version of the AR graphic is displayed to users that are included in a same AR graphics creation session. In one or more examples, the AR graphics synchronization system 646 may determine priorities assigned to the first user 606 and the second user 610 to determine a version of the AR graphic to display to users included in the AR graphics creation session. In at least some examples, AR graphics input made by one or more first users having a first priority may supersede AR graphics input made by one or more second users having a second priority that is lower than the first priority. In one or more illustrative examples, the AR graphics synchronization system 646 may assign priorities to users based on information obtained from the session management system 650 indicating a primary user and one or more secondary users included in the AR graphics creation session. In these scenarios, the primary user may have a higher priority than the one or more secondary users. In situations where the first user 606 is the primary user, the first version of the AR graphic is displayed to users included in the AR graphics creation session and at least a portion of the second AR graphic may be removed from the AR graphic. In scenarios where the second user 610 is the primary user, the second version of the AR graphic is displayed to users included in the AR graphics creation session such that a composite AR graphic including at least a portion of the first AR graphic and at least a portion of the second AR graphic is displayed.

In one or more additional examples, the AR graphics synchronization system 646 may assign priorities to users included in an AR graphics creation session based on a time that the respective users joined the AR content creation session. In these instances, users joining the AR content creation session closer to the beginning of the AR content creation session are assigned priorities that are higher than users joining the AR content creation session later in the AR content creation session. Further, the AR graphics synchronization system 646 may assign priorities to users based on input received from the primary user of the AR content creation session indicating the priorities to be assigned to one or more additional users of the AR content creation session. Additionally, the AR graphics synchronization system 646 may assigned priorities to users included in an AR graphics creation session based on input obtained from a primary user of the AR graphics creation session. For example, the AR graphics synchronization system 646 may receive input from a primary user of the AR graphics creation session indicating a respective priority to assign to individual other users included in the AR graphics creation session. In one or more illustrative examples, the first user 606 may be designated as the primary user of an AR graphics creation session and the AR graphics synchronization system 646 may receive input from the first user 606 indicating a priority to assign to the second user 610, an additional priority to assign to the third user 614, and a further priority to assign to the fourth user 618 with respect to the AR graphics creation session.

In various examples, the priorities and/or roles of a given user may be encoded in a link to join an AR graphics creation session. For example, the AR graphics synchronization system 646 may send an invitation to one or more users 606, 610, 614, 618 to join an AR graphics creation session, where the invitation includes a link that is selectable to join the AR graphics creation session. Responsive to selection of the link by a user 606, 610, 614, or 618, information may be sent to the AR graphics synchronization session that includes at least one of an identifier of the user 606, 610, 614, 618 or a priority assigned to the user 606, 610, 614, or 618 that was included in the link. In at least some examples, the link included in the invitation may also indicate a role of a user 606, 610, 614, or 618, such as a primary user, secondary user, lead user, and so forth.

In still other examples, the AR graphics synchronization system 646 may determine one or more portions of the first AR graphic and one or more portions of the second AR graphic to include in a final version of the AR graphic based on the timing of the inputs used to create the first AR graphic and the second AR graphic. For example, the AR graphics synchronization system 646 may determine a sequence of inputs made by the first user 606 and the second user 610 based on the time that the respective inputs were detected. The AR graphics synchronization system 646 may then cause the AR graphic to be rendered according to the sequence of inputs used to create the first AR graphic and the second AR graphic. In one or more illustrative examples, the final version of the AR graphic may include a portion of the first AR graphic created by a first input made by the first user 606 detected at a first time, followed by a portion of the second AR graphic created by a second input made by the second user 610 detected at a second time subsequent to the first time, and followed by an additional portion of the first AR graphic created by a third input by the first user 606 detected at a third time subsequent to the second time. By implementing one or more rules, protocols, schemas, or frameworks by which to prioritize user input that is used to generate AR graphics, the AR graphics synchronization system 646 may avoid situations where one user included in an AR graphics creation session views one version of an AR graphic and another user included in the AR graphics creation session views a different version of the AR graphic. Further, implementing one or more rules, protocols, schemas, or frameworks by which to prioritize user input may enable the AR graphics system 416 to implement AR graphics creation sessions that are instructive and/or AR graphic creations sessions that are collaborative.

Although the AR graphics services 416, the alignment object detection system 604, the object detection service 510, the AR graphics synchronization system 646, and the session management system 650 are included in the AR graphics system 416 and shown separate from the user devices 604, 608, 612, 616 in the illustrative example of FIG. 6, in one or more implementations, at least a portion of the operations performed the AR graphics services 416, the alignment object detection system 604, the object detection service 510, the AR graphics synchronization system 646, and the session management system 650, or one more combinations thereof, may be performed by one or more of the user devices 604, 608, 612, 616. In various examples, the communication of data between the AR graphics system 416 and the user devices 605, 608, 612, 616 is performed with the use of one or more APIs, such as the API 516 of FIG. 5, and one or more models, such as models 518, 520, 522, in order to minimize the computing resources and memory resources utilized by the user devices 604, 608, 612, 616 to generate AR graphics. That is, since the user devices 604, 608, 612, 616 may include a head-worn device or a wearable device having limited processing resources and memory resources, at least a portion of the operations performed with respect to generating AR graphics may be performed using computing resources and memory resources located remotely from the user devices 604, 608, 612, 616 using one or more calls of an API. In one or more illustrative examples, at least one of the one or more graphics input tool tracking models 518, the one or more hand tracking models 520, and the one or more graphics input tool state models 522 may be stored in memory of the user devices 604, 608, 612, 616, while the AR graphics services 506 are stored and executed using computing resources and memory resources located remotely with respect to the user devices 604, 608, 612, 616.

Figure 7:
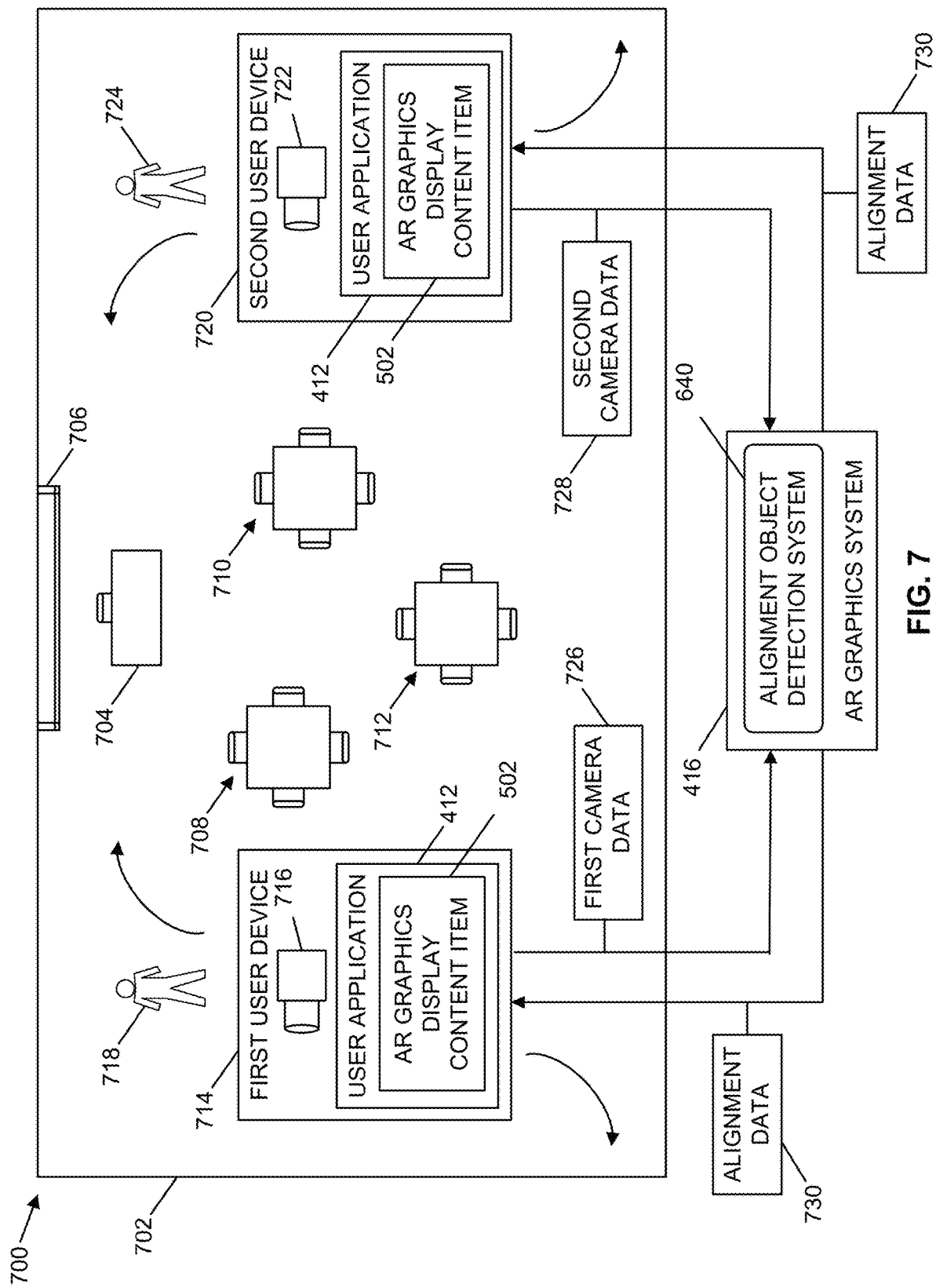
FIG. 7 illustrates a framework to determine an alignment object located in an environment that is designated as an origin of a real-world coordinate system, in accordance with one or more examples.

FIG. 7 illustrates a framework 700 to determine an alignment object located in an environment 702 that is designated as an origin of a real-world coordinate system, in accordance with one or more example implementations. The environment 702 may include a number of objects including one or more first objects 704 and a display device 706. The one or more first objects 704 may include a desk and a chair. In one or more illustrative examples, the one or more first objects 704 may include a teacher desk and chair. Additionally, the display device 706 may include an electronic display device or a non-electronic display device. For example, the display device 706 may include at least one of a monitor, a television, or a screen. Further, the display device 706 may include a whiteboard, a chalkboard, or a portion of a wall. The environment 702 may also include one or more second objects 708, one or more third objects 710, and one or more fourth objects 712. In various examples, the at least one of the one or more second objects 708, the one or more third objects 710, or the one or more fourth objects 712 may include at least one of one or more student desks or one or more student chairs.

The framework 700 may also include a first user device 714 having one or more cameras, such as a first camera 716. The first user device 714 may be operated by a first user 718. Additionally, the framework 700 may include a second user device 720 having one or more cameras, such as a second camera 722. The second user device 720 may be operated by a second user 724. The first user device 714 and the second user device 720 may include data storage resources, such as memory, and processing resources, such as one or more processing units. The first user device 714 and the second user device 720 may individually execute an instance of a user application 412. Further, the first user device 714 and the second user device 720 may execute the AR graphics display content item 502 within the user application 412. In one or more examples, the AR graphics display content item 502 may be executed by at least one of the first user device 714 or the second user device 720 to at least one of create, modify, or display augmented reality graphics. In one or more illustrative examples, the first user device 714 and the second user device 720 may include at least one of a head-worn device, a wearable device, or a mobile computing device, such as a smart phone. In various examples, the first user device 714 and the second user device 720 may comprise multiple computing devices that operate in conjunction with one another. To illustrate, the user devices 714, 720 may include a head-worn device that operates in conjunction with at least one of a wearable device or a mobile computing device. In one or more additional examples, the user devices 714, 720 may include a wearable device that operates in conjunction with a mobile computing device. In one or more illustrative examples, the user devices 714, 720 may include the glasses 100 of FIG. 1. In addition, the framework 700 may include the AR graphics system 416.

In one or more examples, the first user device 714 may capture first camera data 726 and send the first camera data 726 to the AR graphics system 416. The first camera data 726 may include at least one of video content, audio content, or image content of the environment 702. In various examples, the first user 718 may move the first user device 714 to capture content that corresponds to different parts of the environment 702. For example, the first user 718 may move the first user device 714 in different directions to change the field of view of the first camera 716 and capture content corresponding to different portions of the environment 702. In situations where the first user device 714 is a head-worn device, the first user 718 moves their head to cause the first user device 714 to capture content corresponding to different portions of the environment 702. In one or more additional examples, the second user device 720 may also capture at least one of video content, audio content, or image content of the environment 702 and send the content to the AR graphics system 416 as second camera data 728. The second user 724 may also move the second user device 720 to capture content that corresponds to different portions of the environment 702.

The alignment object detection system 640 may analyze at least one of the first camera data 726 or the second camera data 728 to identify objects located in the environment 702. The alignment object detection system 640 may also analyze characteristics of the objects located in the environment 702 to determine an alignment object that corresponds to the environment 702. In one or more examples, the alignment object detection system 640 may send alignment data 730 to the first user device 714 and the second user device 720 indicating an alignment object for the environment 702. In various examples, the alignment object may correspond to an object having less than a threshold probability of moving. In one or more additional examples, the alignment object may correspond to an object having a set of characteristics related to objects that have been previously designated as alignment objects. In one or more illustrative examples, the alignment object may include a teacher desk included in the one or more first objects 704 or the display device 706. The alignment object indicated by the alignment data 730 may correspond to an origin of a real-world coordinate system that covers the environment 702. In this way, the first user device 714 and the second user device 720 have a common frame of reference. Providing a common frame of reference for the first user device 714 and the second user device 720 enables augmented reality graphics created by the first user 718 and the second user 724 to be displayed such that the first user 718 and the second user 724 are viewing the respective augmented reality graphics at a common location within the environment 702.

Figure 8:
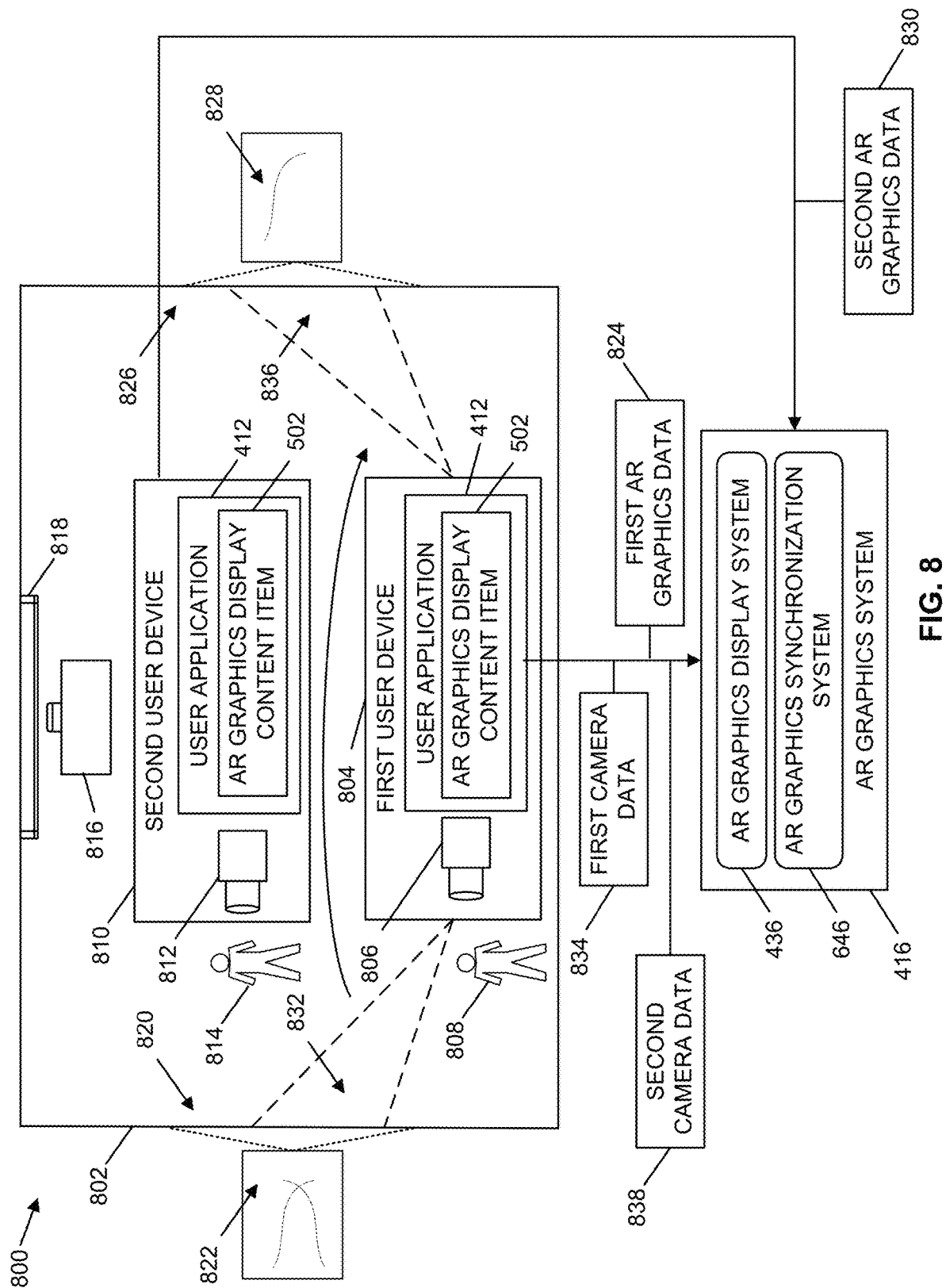
FIG. 8 illustrates a framework to enable users located in an environment to view AR graphics created by other users located in the environment, in accordance with one or more examples.

FIG. 8 illustrates a framework 800 to enable users located in an environment 802 to view AR graphics created by other users located in the environment 802, in accordance with one or more example implementations. The framework 800 may also include a first user device 804 having one or more cameras, such as a first camera 806. The first user device 804 may be operated by a first user 808. Additionally, the framework 800 may include a second user device 810 having one or more cameras, such as a second camera 812. The second user device 810 may be operated by a second user 814. The first user device 804 and the second user device 810 may include data storage resources, such as memory, and processing resources, such as one or more processing units. The first user device 804 and the second user device 810 may individually execute an instance of a user application 412. Further, the first user device 804 and the second user device 810 may execute the AR graphics display content item 502 within the user application 412. In one or more examples, the AR graphics display content item 502 may be executed by at least one of the first user device 804 or the second user device 810 to at least one of create, modify, or display augmented reality graphics. In one or more illustrative examples, the first user device 804 and the second user device 810 may include at least one of a head-worn device, a wearable device, or a mobile computing device, such as a smart phone. In various examples, the first user device 804 and the second user device 810 may comprise multiple computing devices that operate in conjunction with one another. To illustrate, the user devices 804, 810 may include a head-worn device that operates in conjunction with at least one of a wearable device or a mobile computing device. In one or more additional examples, the user devices 804, 810 may include a wearable device that operates in conjunction with a mobile computing device. In one or more illustrative examples, the user devices 804, 810 may include the glasses 100 of FIG. 1. In addition, the framework 700 may include the AR graphics system 416.

The environment 802 may include a number of objects including one or more first objects 816 and a display device 818. The one or more first objects 816 may include a desk and a chair. In one or more illustrative examples, the one or more first objects 816 may include a teacher desk and chair. Additionally, the display device 818 may include an electronic display device or a non-electronic display device. For example, the display device 818 may include at least one of a monitor, a television, or a screen. Further, the display device 818 may include a whiteboard, a chalkboard, or a portion of a wall.

Additionally, the environment 802 may include a first AR graphics display surface 820. The first AR graphics display surface 820 may include at least one of a screen, a display device, or a portion of a wall. The first user 814 may create a first AR graphic 822 that is displayed in conjunction with the first AR graphics display surface 820. The first AR graphic 822 may be created in response to input indicating motion of an AR graphics display tool by the first user 814. For example, the first camera 806 may capture content indicating motion of a graphics input tool by the first user 808 and send the content to the AR graphics system 416 as first AR graphics data 824. The AR graphics display system 436 may, based on the first AR graphics data 824, cause a user interface to be rendered and displayed that includes the first AR graphic 822 in a location of the first AR graphics display surface 820.

The environment 802 may also include a second AR graphics display surface 826. The second AR graphics display surface 826 may include at least one of a screen, a display device, or a portion of a wall. The second user 814 may create a second AR graphic 828 that is displayed in conjunction with the second AR graphics display surface 826. The second AR graphic 828 may be created in response to input indicating motion of an AR graphics display tool by the second user 814. For example, the second camera 812 may capture content indicating motion of a graphics input tool by the second user 814 and send the content to the AR graphics system 416 as second AR graphics data 830. The AR graphics display system 436 may, based on the second AR graphics data 830, cause a user interface to be rendered and displayed that includes the second AR graphic 828 in a location of the second AR graphics display surface 826.

The AR graphics system 416 may determine an alignment object that is located in the environment 802, such as a desk included in the one or more first objects 816, and designate a location of the alignment object as an origin of a real-world coordinate system that corresponds to the environment 802. The AR graphics synchronization system 646 may operate in conjunction with the AR graphics display system 436 to cause the first AR graphic 822 to be displayed in a first location and the second AR graphic 828 to be displayed in a second location when either or both of the first user 808 and the second user 814 are viewing the first AR graphic 822 or the second AR graphic 828. For example, the first camera 806 may have a first field of view 832. The first camera 806 may capture first camera data 834 within the first field of view 832. In various examples, at least one of the AR graphics display system 436 or the AR graphics synchronization system 646 may analyze the first camera data 834 to determine a location of the first field of view 832. The AR graphics display system 436 and/or the AR graphics synchronization system 646 may analyze the location of the first field of view 832 in relation to a location of the first AR graphic 822. In response to determining that the location of the first field of view 832 has at least a threshold amount of similarity with respect to a location of at least a portion of the first AR graphic 822, at least one of the AR graphics display system 436 or the AR graphics synchronization system 646 causes a user interface to be displayed in a location of the first field of view 832 that includes at least a portion of the first AR graphic 822. In one or more illustrative examples, the location of the first AR graphic 822 may include one or more first real-world coordinates and the location of the first field of view 832 may include one or more second real-world coordinates. In one or more examples, the field of view of the first camera 806 may change from the first field of view 832 to a second field of view 836. For example, the first user 808 may cause the first user device 804 to move from a first position corresponding to the first field of view 832 to a second position corresponding to the second field of view 836. In situations where the first user device 804 is a head-worn device, the first user 808 turns their head from a first position corresponding to the first field of view 832 to a second position corresponding to the second field of view 836. In various examples, the AR graphics synchronization system 646 may monitor the content captured by the first camera 806 as the first camera 806 is moved from a first location that corresponds to the first field of view 832 to a second location that corresponds to the second field of view 836. As the location of the field of view of the first camera 806 changes, the AR graphics synchronization system 646 may analyze the location of the current field of view of the first camera 806 in relation to the location of AR graphics that have been created in the environment 802. In the illustrative example of FIG. 8, the first camera 806 captures second camera data 838 that corresponds to the second field of view 836. The AR graphics synchronization system 646 may analyze the second camera data 838 to determine a location that corresponds to the second field of view 836.

In various examples, the first user device 804 may include a head-worn device and a location of at least one of the first field of view 832 or the second field of view 836 may be determined based on at least one of a position of a head of the first user 808, a position of the first user device 804, or the first camera data 806. In one or more examples, as the first user 808 moves throughout the environment 800, at least one of one or more location sensors or one or more inertial measurement unit (IMU) sensors of the first user device 804 may be used to determine a location and/or a heading of the first user 808 within the environment 800. The new location and/or heading of the first user 808 may be expressed as real-world coordinates in relation to an origin defined by the alignment object of the environment 800. A change in location and/or heading of the first user 808 may be determined periodically. For example, the AR graphics synchronization system 646 may periodically request location and/or IMU sensor information from the first user device 804. Additionally, the first user device 804 may periodically send location and/or IMU sensor data to the AR graphics synchronization system 646. Further, the first user device 804 may send location and/or IMU sensor data to the AR graphics synchronization system 646 in response to detecting at least a threshold amount of change in the location and/or IMU sensor data generated by the first user device 804. In one or more illustrative examples, a position of the first user 808 within the environment 800 may be updated from every few seconds to every few minutes. Changes in at least one of location of the first user 808 within the environment 800 or a position of the head of the first user 808 based on at least one of IMU sensor data or location data may be analyzed in conjunction with images captured by the first camera 806 to determine at least one of the first field of view 832 or the second field of view 836.

In the illustrative example of FIG. 8, the first field of view 832 corresponds to a location of the first AR graphic 822. In various examples, the AR graphics synchronization system 646 may analyze a location of the second field of view 836 in relation to a location of the second AR graphic 828. For example, the AR graphics synchronization system 646 may analyze real-world coordinates of the second field of view 836 with respect to real-world coordinates of the second AR graphic 828. The AR graphics synchronization system 646 may determine that the real-world coordinates of the second field of view 836 have at least a threshold amount of similarity with real-world coordinates of at least a portion of the real-world coordinates of the second AR graphic 828. In these situations, the AR graphics synchronization system 646 determines at least a portion of the AR graphic 828 that is within the second field of view 836 of the first camera 806 and operates in conjunction with the AR graphics display system 436 to cause a user interface to be displayed by the first user device 804 that includes at least a portion of the second AR graphic 828. By using an alignment object to designate an origin of a real-world coordinate system that corresponds to the environment 802 and is common to both the first user device 804 and the second user device 810, the first user 808 may view an AR graphic created by the second user 814 in the same location that the AR graphic was originally created even though the first user device 804 is in a location of the environment 802 that is different from the location of the second user device 810 and has a perspective that is different from the perspective of the second user 814.

Figure 9:
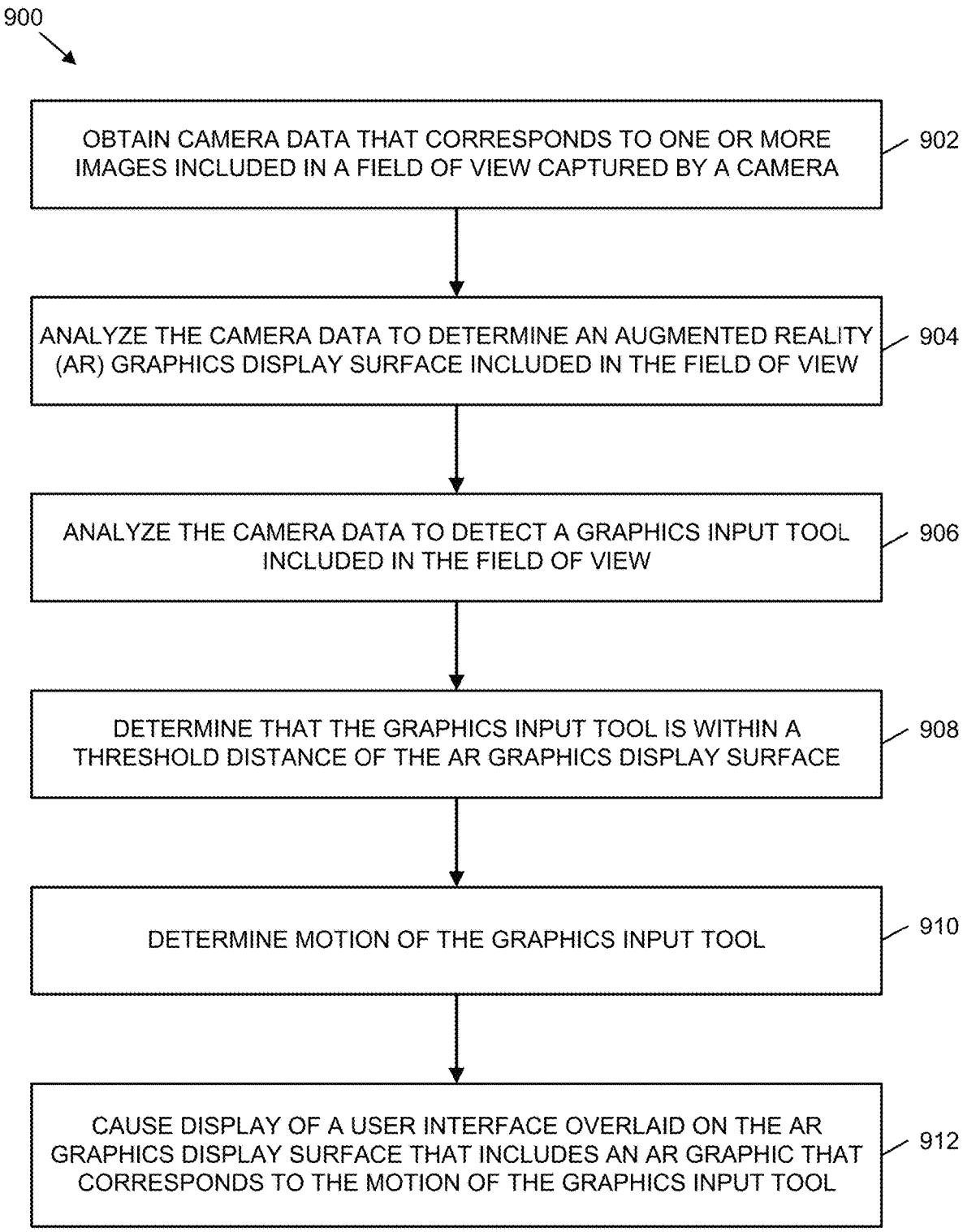
FIG. 9 is a flow diagram of a process to cause a user interface to be displayed with augmented reality graphics overlaid on a surface located in an environment, in accordance with one or more examples.
Figure 10:
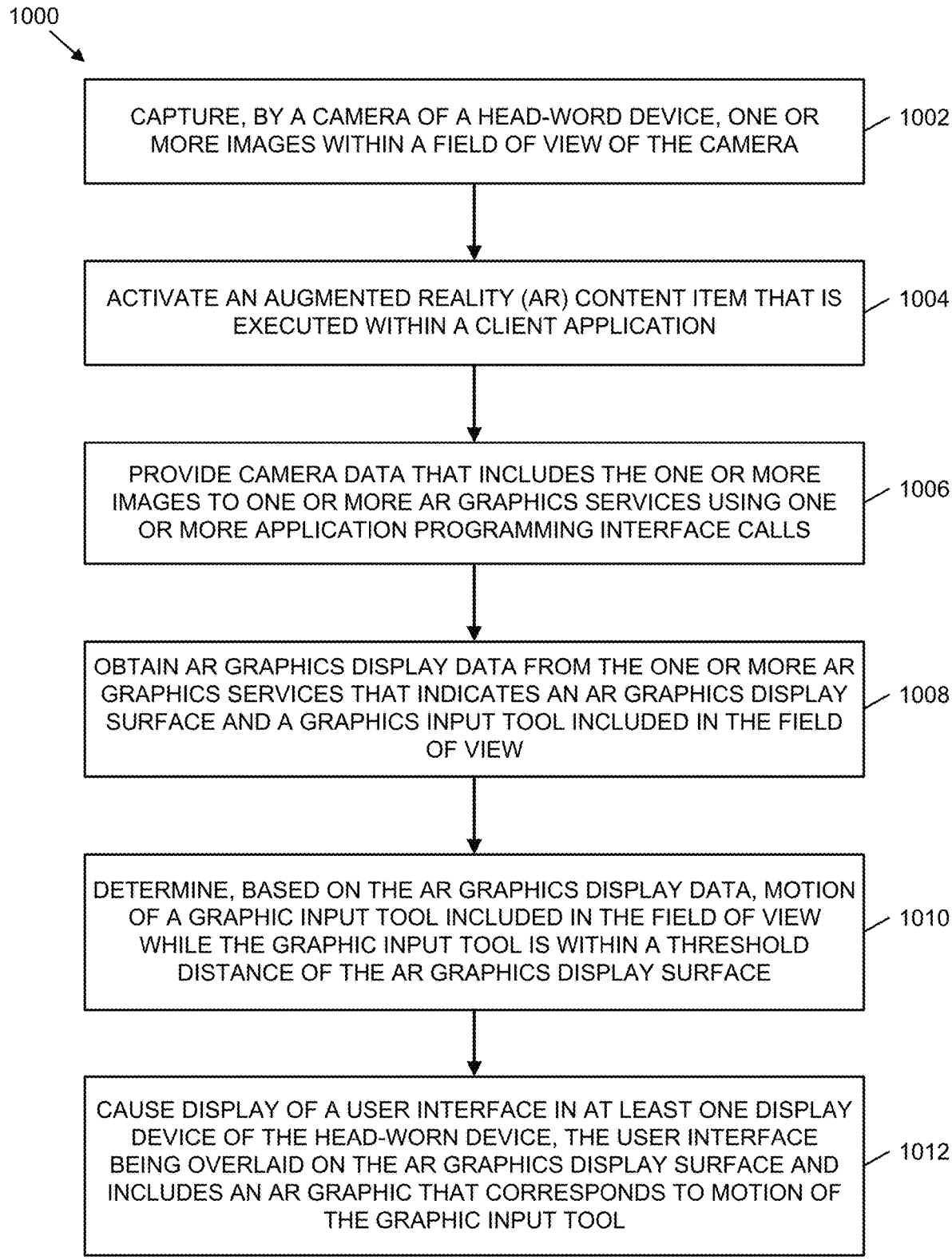
FIG. 10 is a flow diagram of a process to activate an augmented reality content item that uses data captured by a camera of a head-worn device to generate a user interface that includes augmented reality graphics overlaid on a surface located in an environment, in accordance with one or more examples. alignment
Figure 11:
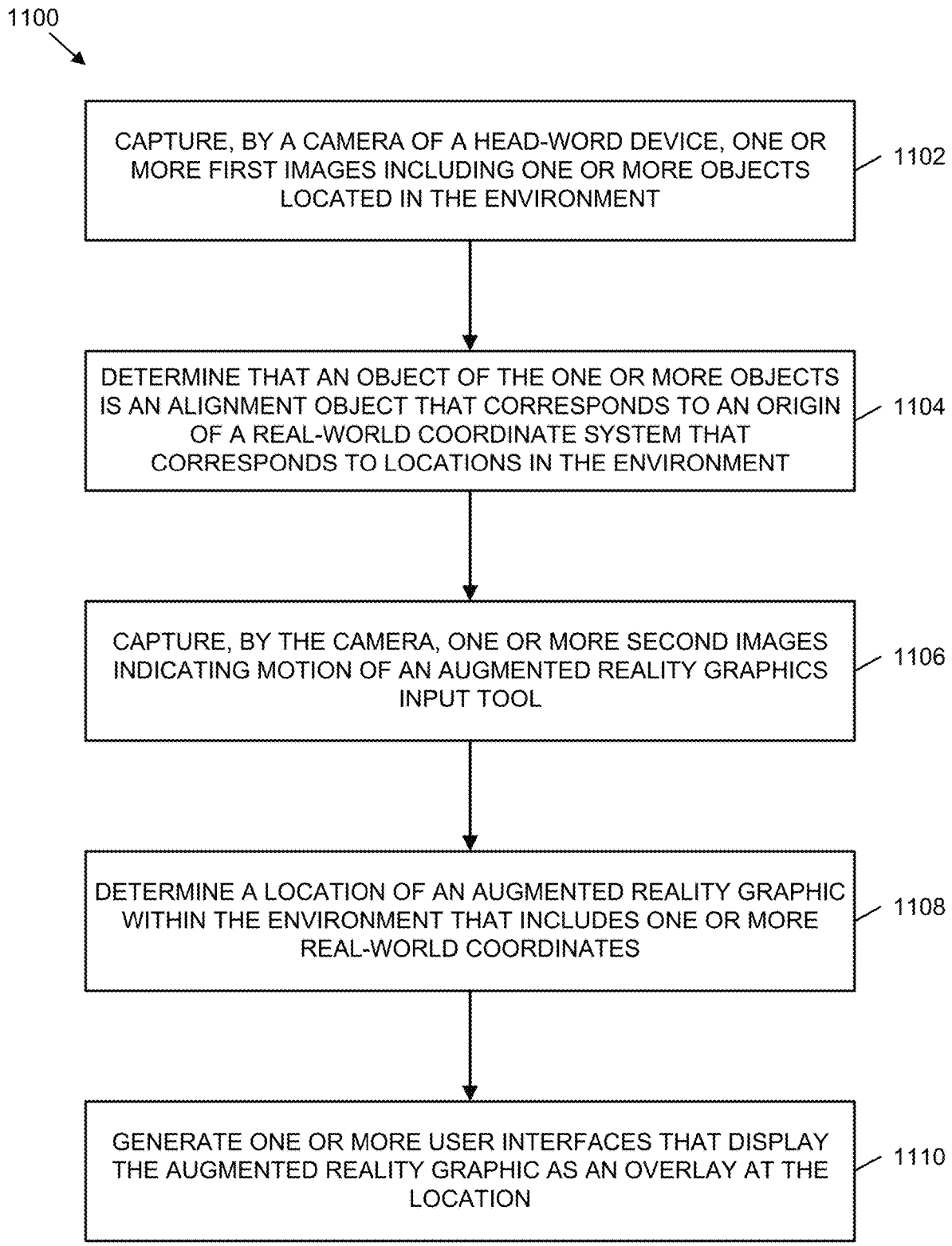
FIG. 11 is a flow diagram of a process to cause augmented reality graphics created by multiple users within an environment to be viewable by the individual users, in accordance with one or more examples.

FIGS. 9-11 illustrate flowcharts of processes to generate AR graphics as overlays of an AR graphics display surface located in a real-world scene. The processes may be embodied in computer-readable instructions for execution by one or more processors such that the operations of the processes may be performed in part or in whole by the functional components of at least one of one or more user devices or one or more server systems. Accordingly, the processes described below are by way of example with reference thereto, in some situations. However, in other implementations, at least some of the operations of the processes described with respect to FIGS. 9-11 may be deployed on various other hardware configurations. The processes described with respect to FIGS. 9-11 are therefore not intended to be limited to the being performed by one or more server systems or one or more user device described herein and can be implemented in whole, or in part, by one or more additional components. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 9 is a flow diagram of a process 900 to cause a user interface to be displayed with augmented reality graphics overlaid on a surface located in an environment, in accordance with one or more examples. The process 900 may include, at operation 902, obtaining camera data that corresponds to one or more images of a field of view captured by a camera. The camera may be located in a user device. The user device may include a head-worn device. In addition, the user device may include at least one of a wearable device or a mobile phone. The camera data may include a plurality of images of a real-world scene. In one or more examples, the camera data may include a number of video frames. In various examples, the camera data may include video frames captured from a plurality of cameras of a user device.

At operation 904, the process 900 may include analyzing the camera data to determine an augmented reality (AR) graphics display surface included in the field of view. In one or more examples, determining the AR graphics display surface may be performed in response to launching of an augmented reality content item that is executing within a user application. For example, the functionality of generating AR graphics as an overly of an AR graphics display surface may be performed, at least partly, based on computer-readable code of an augmented reality content item that executes within a user application.

A number of characteristics of objects of interest included in the camera data may be analyzed to identify the AR graphics display surface. For example, at least one of dimensions, color, texture, or shape of objects of interest may be analyzed to identify the AR graphics display surface. One or more object recognition computational techniques may be used to analyze the camera data to identify the AR graphics display surface in the real-world scene. In one or more illustrative examples, one or more neural networks may be executed to identify the AR graphics display surface. In various examples, the one or more neural networks may be trained using previously captured images of objects that correspond to an AR graphics display surface. In one or more additional examples, the AR graphics display surface may be identified based at least in part on input obtained from a user of the user device indicating the AR graphics display surface in the field of view.

The AR graphics display surface may be a two-dimensional surface in a real-world scene having at least a minimum length and at least a minimum width. In one or more examples, the AR graphics display surface may include a wall, a floor, a table, a projection screen, a piece of furniture, a canvas, a sketch pad, one or more pieces of paper, a posterboard, one or more combinations thereof, and the like. In various examples, the AR graphics display surface may be affixed to a wall or other structure. In one or more illustrative examples, the AR graphics display surface may have at least one of a length or width of at least 8 cm, at least 12 cm, at least 15 cm, at least 18 cm, at least 20 cm, at least 30 cm, at least 50 cm, or at least 100 cm. In situations where a surface, such as a wall or floor comprises the entire field of view of the camera, at least a portion of the surface included in the field of view is identified as the AR graphics display surface.

In addition, at operation 906, the process 900 may include analyzing the camera data to detect a graphics input tool included in the field of view. The graphics input tool may include a handheld implement that may be manipulated by a user in a manner that corresponds to motion produced in the making of markings on a surface, such as handwriting, painting, drawing, one or more combinations thereof, and the like. In one or more additional examples, the graphics input tool may include a finger of a user.

The process 900 may also include, at operation 908, determining that the graphics input tool is within a threshold distance of the AR graphics display surface. In one or more examples, determining that the graphics display tool is within the threshold distance of the AR graphics display surface may include determining, based on the camera data, that the graphics input tool is touching the AR graphics display surface. In various examples, determining that the graphics input tool is within the threshold distance of the AR graphics display surface may include determining depth information indicating a distance of the graphics input tool from the AR graphics display surface.

Further, at operation 910, the process 900 may include determining, based on the camera data, motion of the graphics input tool while the graphics input tool is within the threshold distance of the AR graphics display surface. The motion of the graphics input tool may be determined based on changes in the location of the graphics input tool in a number of video frames.

In one or more additional examples, the camera data may be analyzed to detect a hand grasping the graphics input tool included in the field of view. In various examples, a first position of the hand with respect to a second position of the graphics input tool may be determined. For example, an angle of the graphics input tool may be determined based on the first position of the hand with respect to the second position of the graphics input tool. In one or more scenarios, motion of the hand while the graphics input tool is within the threshold distance of the AR graphics display surface may be determined based on the camera data. Characteristics of the AR graphic may be based on the motion of the graphics input tool, the motion of the hand, and the first position of the hand with respect to the second position of the graphics input tool. To illustrate, motion of the graphics input tool, motion of the hand, and an angle of the graphics input tool may be used to determine a width of markings generated in response to motion of the graphics input tool.

In one or more examples, an application programming interface (API) may be provided that enables information to be obtained from one or more services to detect objects in a real-world scene and to track the motion of the objects in the real-world scene. For example, the analysis of the camera data to detect the graphics input tool in the real-world scene may be performed in response to one or more first API calls to an object detection service. In addition, determining a distance between the graphics input tool and the AR graphics display surface and/or determining whether the graphics input tool is within a threshold distance of the AR graphics display surface may be performed in response to one or more second API calls to a depth determination service. Further, determining the motion of the graphics input tool may be performed in response to one or more third API calls to an object tracking service.

At operation 912, the process 900 may also include causing display of a user interface overlaid on the AR graphics display surface. The user interface may include an AR graphic that corresponds to the motion of the graphics input tool. In one or more examples, one or more machine learning models may be implemented to determine an amount of bending of a tip of the graphics input tool. A size of a marking may then be determined based on the amount of bending of the tip of the graphics input tool. In various examples, the one or more machine learning models may be trained using a supervised machine learning training technique based on a training data set. The training data set may include a first number of images of graphics input tools that correspond to a first amount of bending of the tips of the graphics input tools that are associated with a first label and a second number of images of graphics input tools that correspond to a second amount of bending of the tips of the graphics input tools that are associated with a second label.

In various examples, an AR graphics menu may be displayed within the user interface. The AR graphics menu may include a number of user interface elements. Individual user interface elements may be selectable to activate one or more features of an augmented reality content item to at least one of create or modify at least a portion of the AR graphic. For example, the AR graphics menu may include user interface elements that are selectable to create markings of the AR graphic having a specified color. In one or more examples, a feature that corresponds to a respective user interface element may be activated in response to determining that an object included in the field of view is within an additional threshold distance of a user interface element of the number of user interface elements of the AR graphics menu. The additional threshold distance used to determine when to activate a feature of a user interface element may be the same as or different from the threshold distance between the graphics input tool and the AR graphics display surface that triggers the generating of markings used to create the AR graphics.

In one or more examples, at least one of the user interface or the AR graphic may be modified. For example, additional AR graphics may be added to the user interface. In addition, an existing AR graphic may be modified by adding additional markings to the AR graphic. Further, at least one of the user interface or the AR graphic may be modified by executing an additional augmented reality content item with respect to at least one of the AR graphic or the AR graphics display surface. The additional augmented reality content item may be executable to cause one or more additional AR graphics to be displayed in the user interfaces. For example, the additional augmented reality content item may cause the display of at least one of images of items, text content, animations, or additional computer-generated graphics, such as emojis, stickers, or avatars, in the user interface. The additional augmented reality content item may also be executable to modify an appearance of the AR graphic, such as modifying at least one of a shape, color, or size of the AR graphic. In one or more illustrative examples, user input to select the additional augmented reality content item from the AR graphics menu may cause the user interface to be modified in accordance with the additional augmented reality content item.

In at least some examples, the AR graphic may be saved in association with the AR graphics display surface. Thus, as a user device including the camera moves away from the AR graphics display surface, the user interface may be modified to no longer show the AR graphic. Additionally, when the user device including the camera moves such that the AR graphics display surface is within the field of view of the camera, the AR graphic may reappear in the user interface. For example, the field of view of the camera may change from a first field of view that includes the AR graphics display surface to a second field of view in which the AR graphics display surface is absent. In these scenarios, the user interface is modified by removing the AR graphic from the user interface. In various examples, when the field of view of the camera has changed from the second field of view back to the first field of view, the user interface may be modified by adding the AR graphic to the user interface.

Further, additional camera data may be obtained that corresponds to one or more additional images of the second field of view captured by the camera. The additional camera data may include one or more additional images captured during a period of time subsequent to an initial period of time in which the one or more images of the initial camera data were captured. In these instances, the additional camera data is analyzed to determine an additional AR graphics display surface included in the second field of view. In addition, the additional camera data may be analyzed to detect the graphics input tool in the second field of view and to determine that the graphics input tool is within a threshold distance of the additional AR graphics display surface. Additional motion of the graphics input tool may also be determined based on the additional camera data while the graphics input tool is within the threshold distance of the additional AR graphics display surface. As a result, an additional user interface may be displayed that is overlaid on the additional AR graphics display surface, where the additional user interface includes an additional AR graphic that corresponds to the additional motion of the graphics input tool. In various examples, the additional AR graphic may be stored in conjunction with the additional AR graphics display surface.

In one or more additional examples, distance information may be used to adjust the appearance of an AR graphic displayed in the user interface. For example, coordinates in real world space for the AR graphics display surface may be determined and the coordinates in real world space may be used to determine a distance from the camera to the AR graphics display surface. Location data for the camera, such as location coordinates of a user device housing the camera, may also be used to determine a distance between the camera to the AR graphics display surface. In one or more illustrative examples, the distance from the camera to the AR graphics display surface may change from a first distance to a second distance. In these scenarios, a level of magnification of the AR graphic within the user interface is modified based on the distance from the camera to the AR graphics display changing from the first distance to the second distance. To illustrate, as the camera moves farther from the AR graphics display surface, magnification of the AR graphic may increase. Additionally, in situations where the camera moves closer to the AR graphics display surface, the magnification of the AR graphic decreases. In this way, the appearance of the AR graphic may be relatively consistent as the distance between the camera and the AR graphics display surface changes.

FIG. 10 is a flow diagram of a process 1000 to activate an augmented reality content item that uses data captured by a camera of a head-worn device to generate a user interface that includes augmented reality graphics overlaid on a surface located in an environment, in accordance with one or more examples. At operation 1002, the process 1000 may include capturing, by a camera of a head-worn device, one or more images within a field of view of the camera. The head-worn device may include at least one display device that displays user interfaces viewable by a user of the head-worn device.

The process 1000 may include, at operation 1004, activating an augmented reality (AR) content item that is executed within a user application. For example, a user may select an icon of an augmented reality content item from a menu of augmented reality content items to active the AR content item. In one or more illustrative examples, the AR content item may include the AR graphics display content item 502 of FIG. 5.

In addition, at operation 1006, the process 1000 may include in response to activating the augmented reality content item, providing camera data that includes the one or more images to one or more AR graphics services using one or more application programming interface (API) calls. The camera data may correspond to the one or more images captured by the camera of the head-worn device. In various examples, the camera data may be analyzed by the one or more AR graphics services to generate AR graphics within a user interface displayed by the head-worn device.

The process 1000 may also include, at operation 1008, obtaining AR graphics display data from the one or more AR graphics services. The AR graphics display data may indicate at least one of an AR graphics display surface or a graphics input tool included in the field of view. In one or more examples, the camera data may be analyzed by an object detection service that is a component of at least one of a surface detection system or an object detection system to determine an object of interest included in the field of view that corresponds to an AR graphics display surface. In various examples, characteristics of one or more objects of interest included in the field of view may be analyzed to determine the AR graphics display surface. In various examples, the AR graphics display data may indicate at least one of a location, dimensions, or a shape of the AR graphics display surface. Additionally, the AR graphics display data may indicate at least one of a location, a size, a shape, or dimensions of the graphics input tool.

Additionally, the process 1000 may include, at operation 1010, determining, based on the AR graphics display data, motion of a graphics input tool included in the field of view while the graphic input tool is within a threshold distance of the AR graphics display surface. The graphics input tool may be identified by the object detection service analyzing the camera data to determine an object of interest having characteristics that correspond to characteristics of graphics input tools. The motion of the graphics input tool may be determined by an object tracking service analyzing the camera data and providing information to one or more graphics input tool tracking models. At least one of the object tracking service or the graphics input tool tracking models may be a component of an object tracking system. The motion of the graphics input tool may be identified by determining differences in location of the graphics input tool in a number of frames of video captured by the camera.

Determining that the graphics input tool is within the threshold distance of the AR graphics display surface may include determining a distance between the graphics input tool and the AR graphics display surface. In one or more examples, at least one of a depth determination service that may be a component of an AR graphics display system or the object tracking service 512 may provide information to one or more graphics input tool state models to determine that marking features of the augmented reality content item are activated and that the graphics display tool is within the threshold distance of the AR graphics display surface. In various examples, a determination may be made that the graphics input tool is outside of the threshold distance of the AR graphics display surface. In these instances, marking functionality features of the augmented reality content item are deactivated such that markings are no longer produced based on motion of the graphics input tool.

At operation 1012, the process 1000 may also include causing display of a user interface overlaid on the AR graphics display surface. The user interface may include an AR graphic that corresponds to the motion of the graphic input tool. The user interface may also include a menu that includes a number of user interface elements that may be selectable to produce markings of AR graphics that have respective colors or widths.

FIG. 11 is a flow diagram of a process 1100 to cause augmented reality graphics created by multiple users within an environment to be viewable by the individual users, in accordance with one or more examples. At operation 1102, the process 1100 may include capturing one or more first images of an environment. The one or more first images may include one or more objects located in the environment. wherein the computing device is a head-worn device that includes at least one display device and the one or more user interfaces are displayed by the at least one display device.

The process 1100 may also include, at operation 1104, determining that an object of the one or more objects is an alignment object. The alignment object may correspond to an origin of a real-world coordinate system that corresponds to locations in the environment. One or more characteristics of the one or more objects may be analyzed with respect to characteristics of objects that have been previously designated as alignment objects. An object may be designated as an alignment object in situations where the characteristics of the object have at least a threshold amount of similarity with respect to objects that have previously been designated as alignment objects. In at least some examples, one or more application programming interface (API) calls may be provided to cause one or more AR graphics services to analyze camera data to determine an alignment object in the environment. In one or more illustrative examples, the one or more API calls may be provided in response to initiation of an AR graphics content creation session.

Additionally, at operation 1106, the process 1100 may include capturing one or more second images indicating motion of an augmented reality graphics input tool. The motion of the augmented reality graphics tool may correspond to edges and/or contours of an AR graphic. The motion of the augmented reality graphics tool may also indicate one or more colors and/or textures of an AR graphic. In various examples, the motion of the augmented reality graphics input tool may be captured in response to determining that the augmented reality graphics input tool is within a threshold distance of an AR graphics display surface.

In one or more examples, the augmented reality graphics input tool may be identified by the object detection service analyzing the camera data to determine an object of interest having characteristics that correspond to characteristics of graphics input tools. The motion of the graphics input tool may be determined by an object tracking service analyzing the camera data and providing information to one or more graphics input tool tracking models. At least one of the object tracking service or the graphics input tool tracking models may be a component of an object tracking system. The motion of the graphics input tool may be identified by determining differences in location of the graphics input tool in a number of frames of video captured by the camera.

Determining that the graphics input tool is within the threshold distance of the AR graphics display surface may include determining a distance between the graphics input tool and the AR graphics display surface. In one or more examples, at least one of a depth determination service that may be a component of an AR graphics display system or the object tracking service 512 may provide information to one or more graphics input tool state models to determine that marking features of the augmented reality content item are activated and that the graphics display tool is within the threshold distance of the AR graphics display surface. In various examples, a determination may be made that the graphics input tool is outside of the threshold distance of the AR graphics display surface. In these instances, marking functionality features of the augmented reality content item are deactivated such that markings are no longer produced based on motion of the graphics input tool.

In one or more examples, a request may be sent to an augmented reality graphics system to join an augmented reality graphics creation session that includes one or more individuals. In response to the request, an identifier of the augmented reality graphics creation session may be obtained. In at least some examples, the augmented reality graphics creation session may be conducted within an augmented reality content item that has been activated. In various examples, the augmented reality content item may be activated in response to selection of a user interface element that corresponds to the augmented reality content item. In one or more additional examples, first camera data may be generated that includes the one or more first images and the identifier of the augmented reality graphics creation session and second camera data may be generated that includes the one or more second images and the identifier of the augmented reality graphics creation session. The first camera data and the second camera data may be sent to an augmented reality graphics system to be analyzed to determine an alignment object and/or to determine locations of AR graphics within the environment.

Further, the process 1100 may, at operation 1108, include determining a location of an augmented reality graphic within the environment. The augmented reality graphic may be based on the motion of the augmented reality graphic tool and the location of the augmented reality graphic may include one or more real-world coordinates of the real-world coordinate system. At operation 1110, the process 1100 may include generating one or more user interfaces that display the augmented reality graphic as an overlay of a real-world scene that comprises the location of the augmented reality graphic. In one or more examples, the one or more user interfaces may be displayed in relation to one or more first additional images captured within a first field of view of the camera. In various examples, augmented reality graphics data may be accessed that corresponds to an additional AR graphic that is created by an additional individual included in the augmented reality graphics creation system. In one or more illustrative examples, the augmented reality graphics data may be accessed in response to a change in the field of view of the camera of a user device operated by the individual from a first field of view to a second field of view. In one or more additional examples, one or more additional user interfaces may be displayed that include the additional augmented reality graphic as an additional overlay at an additional location of the one or more additional locations.

Figure 12:
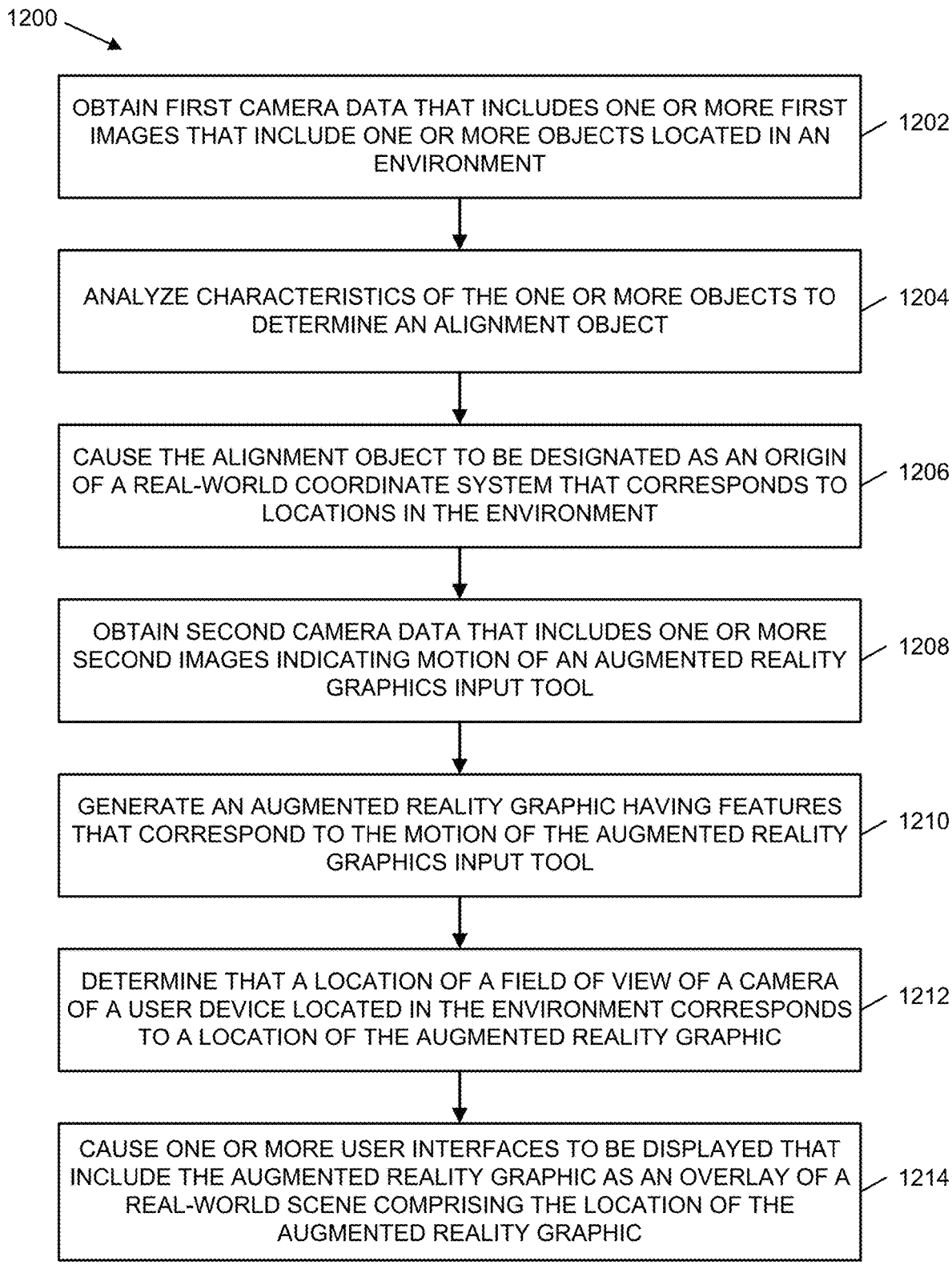
FIG. 12 is a flow diagram of a process to determine an alignment object to coordinate the display of augmented reality graphics created by multiple users located in an environment, in accordance with one or more implementations.

FIG. 12 is a flow diagram of a process 1200 to determine an alignment object to coordinate the display of augmented reality graphics created by multiple users located in an environment, in accordance with one or more implementations. At operation 1202, the process 1200 may include obtaining first camera data that includes one or more first images of an environment. The one or more first images may include one or more objects located in the environment.

In addition, at operation 1204, the process 1200 may include analyzing characteristics of the one or more objects to determine an alignment object from among the one or more objects. In one or more examples, determining the alignment object may include analyzing the one or more characteristics of the one or more objects in relation to one or more additional characteristics of one or more additional objects. The one or more additional objects may have previously been designated as at least one alignment objects, the one or more additional characteristics may have been predetermined to be characteristics of alignment objects, or a combination thereof. Additionally, a measure of similarity may be determined between the one or more characteristics of individual objects of the one or more objects and the one or more additional characteristics. An object may be designated as the alignment object in response to determining that the one or more characteristics of the alignment object have at least a threshold measure of similarity with the one or more additional characteristics. In one or more illustrative examples, the characteristics of the one or more objects may include at least one of one or more shapes, one or more textures, one or more colors, one or more contours, one or more edges, or one or more dimensions. In various examples, the one or more additional characteristics may be determined using one or more machine learning models that are trained with images of objects previously designated as alignment objects.

The process 1200 may also include, at operation 1206, causing the alignment object to be designated as an origin of a real-world coordinate system that corresponds to locations in the environment. In at least some examples, the alignment object may be determined based on analyzing camera data obtained from multiple user devices and identifying an object that is a shared object in the camera data from the at least a portion of the multiple user devices, where the shared object has characteristics that have at least a threshold amount of similarity with characteristics of objects previously designated as alignment objects.

Further, at operation 1208, the process 1200 may include obtaining second camera data that includes one or more second images of the environment. The one or more second images may indicate motion of an augmented reality graphics input tool. At operation 1210, the process 1200 may also include generating an augmented reality graphic having features that correspond to the motion of the augmented reality graphics input tool. The augmented reality graphic may be generated based on first input corresponding to a first individual operating a first user device located in the environment. The first input may indicate the motion of the augmented reality graphics input tool.

Additionally, the process 1200 may include, at operation 1212, determining that a first location of a field of view of a camera of a user device located in the environment corresponds to a second location of the augmented reality graphic. In one or more examples, determining that the first location corresponds to the second location may include analyzing first real-world coordinates of the real-world coordinate system that correspond to the field of view of the camera in relation to one or more second real-world coordinates of the real-world coordinate system that correspond to the augmented reality graphic. In one or more additional examples, determining that the first location corresponds to the second location may include obtaining third camera data that corresponds to one or more third images of the environment and analyzing the third camera data to determine that the field of view of the camera has changed from a first field of view to a second field of view.

The process 1200 may also include, at operation 1214, causing one or more user interfaces to be displayed that include the augmented reality graphic as an overlay of a real-world scene comprising the second location of the augmented reality graphic. In one or more further examples, one or more additional user interface may be displayed that include an additional augmented reality graphic that may be generated based on second input corresponding to a second individual operating a second user device located in the environment. In various examples, the one or more second user interfaces may be displayed at the location that corresponds to a second field of view of the camera and an additional location of the environment.

Additionally, in one or more examples, the augmented reality graphic may be generated as part of an augmented reality graphics creation session that includes a number of individuals, such as a first individual and a second individual. In one or more examples, the first individual may be designated as a primary user and the second individual may be designated as a secondary user. In at least some examples, a first priority may be assigned to the first individual that is greater than a second priority that is assigned to the second individual. In various examples, a composite augmented reality graphic may be generated from a combination of a first augmented reality graphic created by the first individual and a second augmented reality graphic created by the second individual. In one or more additional examples, the composite augmented reality graphic may be generated by removing at least a portion of the second augmented reality graphic due to one or more conflicts or overlap with the first augmented reality graphic according to the priorities assigned to the first individual and the second individual, such that the characteristics and features of the first augmented reality graphic have a greater priority over the characteristics and features of the second augmented reality graphic.

Figure 13:
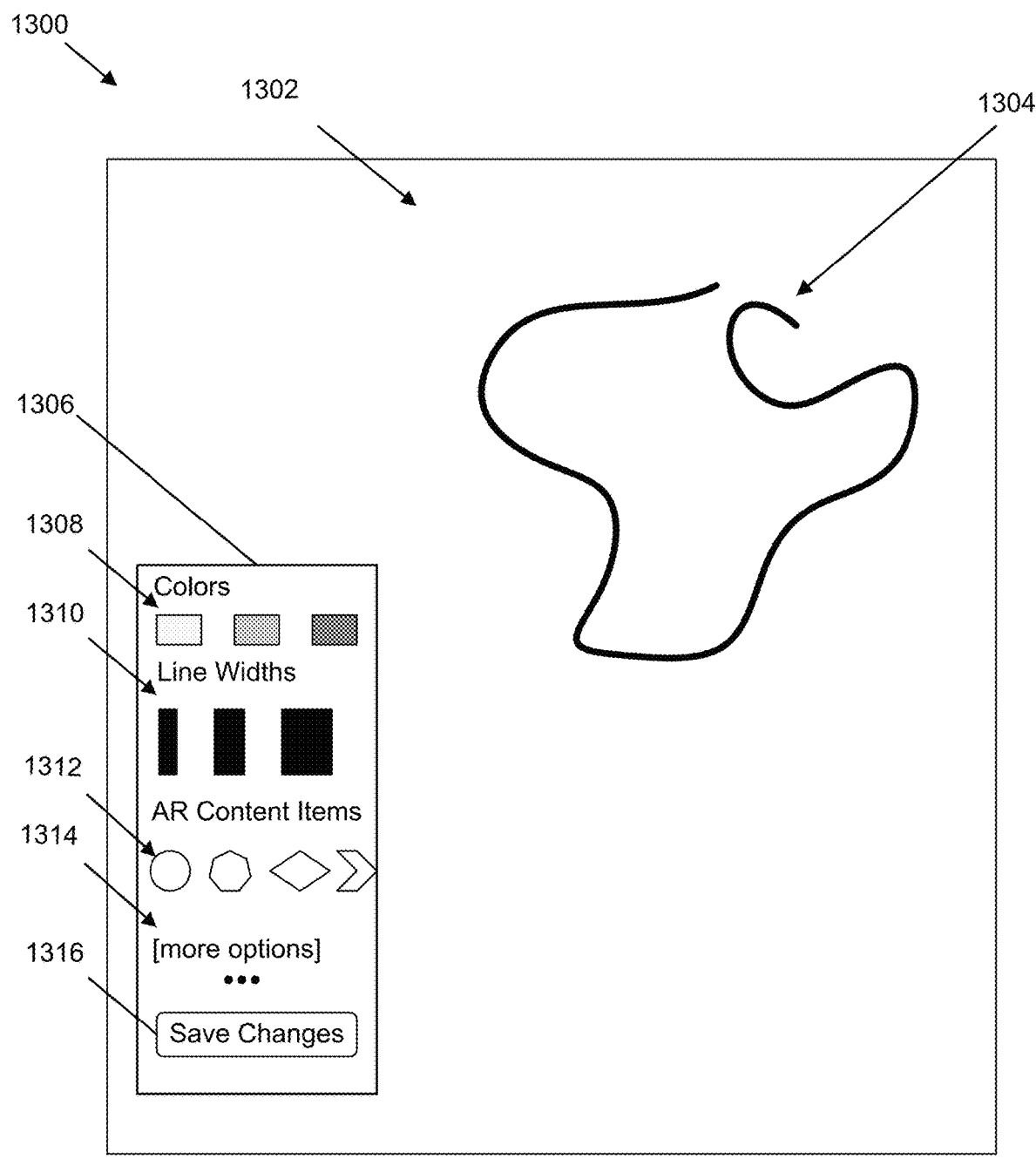
FIG. 13 is a user interface that includes augmented reality graphics overlaid on a surface, in accordance with one or more examples.

FIG. 13 is a user interface 1300 that includes augmented reality graphics overlaid on a surface, in accordance with one or more examples. The user interface 1300 may include an AR graphics display surface 1302. The AR graphics display surface 1302 may include a portion of a wall, table, floor, or another surface that is suitable as a background for the display of AR graphics. In one or more examples, the AR graphics display surface 1302 may have a size that is greater than a field of view of a camera capturing images of the AR graphics display surface 1302. In these examples, the user interface 1300 may display a portion of the AR graphics display surface 1302.

The user interface 1300 may also display an AR graphic 1304. The AR graphic 1304 may be displayed as an overlay of the AR graphics display surface 1302. The AR graphic 1304 may be displayed in response to a path of motion of a graphics input tool across the AR graphics display surface 1302. In one or more examples, the AR graphic 1304 may be part of a painting, text content, a drawing, one or more combinations thereof, and the like.

The user interface 1300 may also include a menu 1306. The menu 1306 may be displayed as an overlay of the AR graphics display surface 1302. The menu 1306 may include a number of user interface elements that are selectable to at least one of create or modify the AR graphic 1304. For example, the menu 1306 may include first user interface elements 1308 that are selectable to cause markings of an AR graphic to be generated having a respective color that corresponds to the selected first user interface element 1308. Additionally, the menu 1306 may include second user interface elements 1310 that are selectable to cause marking of an AR graphic to be generated having line widths that correspond to the respective second user interface elements 1310. The menu 1306 may also include third user interface elements 1312 that may be selectable to execute augmented reality content items that correspond to the respective third user interface elements 1312. In one or more illustrative examples, the individual third user interface elements 1312 may correspond to a respective sticker that may be displayed in conjunction with the AR graphic 1304. Further, the menu 1306 may include a fourth user interface element 1314 that is selectable to cause additional selectable options to be displayed. The additional selectable options may correspond to additional augmented reality content items, additional colors, additional line widths, additional characteristics of AR graphics, one or more combinations thereof, and so forth. In addition, the menu 1306 may include a fifth user interface element 1316 that is selectable to save the AR graphic 1304. In one or more examples, the AR graphic 1304 may be saved in association with the AR graphics display surface 1302, such that the AR graphic 1304 is displayed in response to the AR graphics display surface 1302 being in a field of view of a user device that is displaying the user interface 1300.

Figure 14:
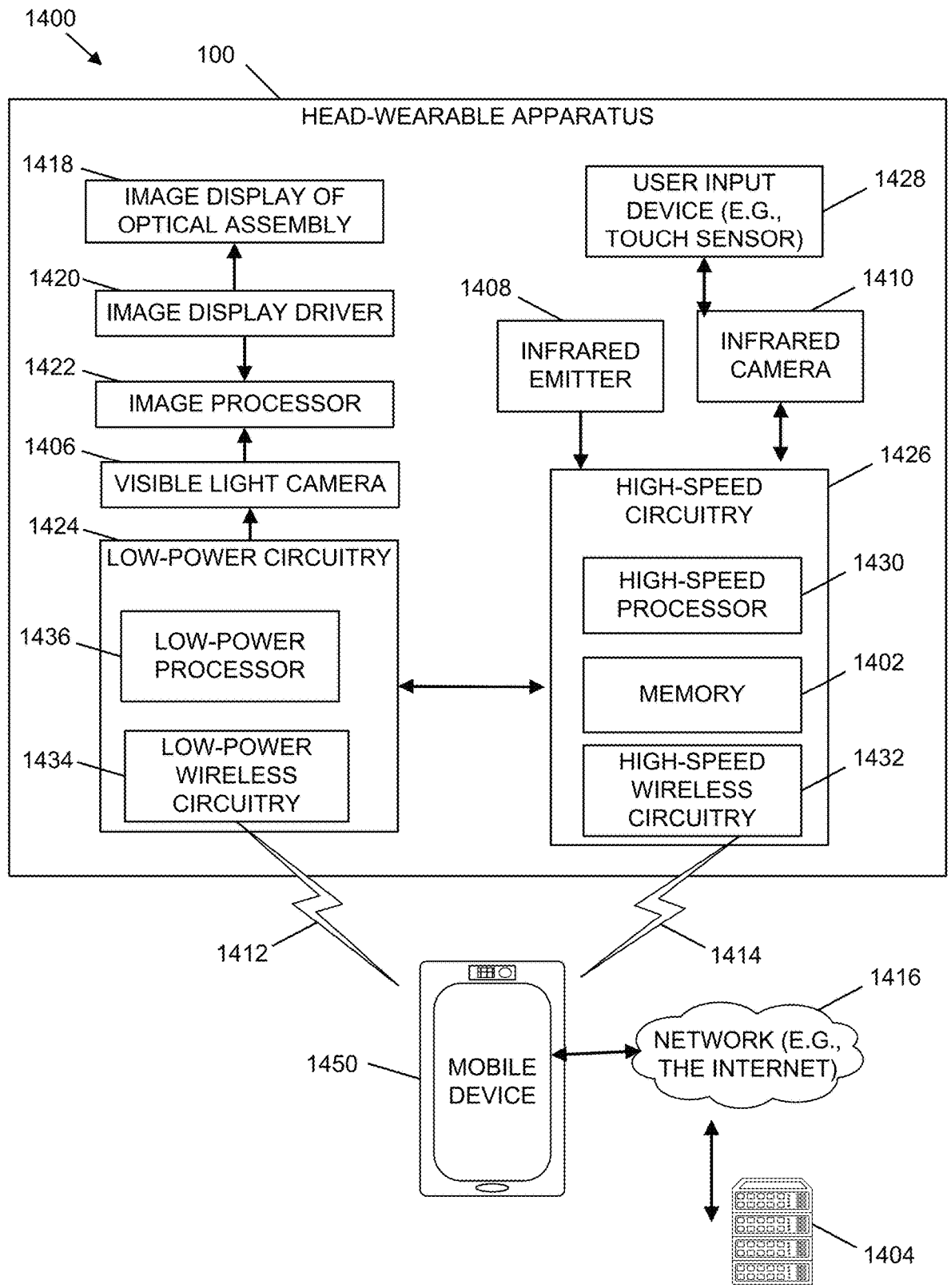
FIG. 14 is a block diagram illustrating details of the head-worn device of FIG. 1, in accordance with one or more examples.

FIG. 14 is a block diagram illustrating a networked system 1400 including details of the glasses 100, in accordance with some examples. FIG. 14 illustrates a system 1400 including a head-wearable apparatus 100 with a selector input device, according to some examples. FIG. 14 is a high-level functional block diagram of an example head-wearable apparatus 100 communicatively coupled to a mobile device 1450 and various server systems 1404 (e.g., the interaction server system 1510 described with respect to FIG. 11) via various networks 1416.

The head-wearable apparatus 100 includes one or more cameras, each of which may be, for example, a visible light camera 1406, an infrared emitter 1408, and an infrared camera 1410.

The mobile device 1450 connects with head-wearable apparatus 100 using both a low-power wireless connection 1412 and a high-speed wireless connection 1414. The mobile device 1450 is also connected to the server system 1404 and the network 1416.

The head-wearable apparatus 100 further includes two image displays of the image display of optical assembly 1418. The two image displays of optical assembly 1418 include one associated with the left lateral side and one associated with the right lateral side of the head-wearable apparatus 100. The head-wearable apparatus 100 also includes an image display driver 1420, an image processor 1422, low-power circuitry 1424, and high-speed circuitry 1426. The image display of optical assembly 1418 is for presenting images and videos, including an image that can include a graphical user interface to a user of the head-wearable apparatus 100.

The image display driver 1420 commands and controls the image display of optical assembly 1418. The image display driver 1420 may deliver image data directly to the image display of optical assembly 1418 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 100 includes a frame and stems (or temples) extending from a lateral side of the frame. The head-wearable apparatus 100 further includes a user input device 1428 (e.g., touch sensor or push button), including an input surface on the head-wearable apparatus 100. The user input device 1428 (e.g., touch sensor or push button) is to receive from the user an input selection to manipulate the graphical user interface of the presented image.

The components shown in FIG. 14 for the head-wearable apparatus 100 are located on one or more circuit boards, for example a PCB or flexible PCB, in the rims or temples. Alternatively, or additionally, the depicted components can be located in the chunks, frames, hinges, or bridge of the head-wearable apparatus 100. Left and right visible light cameras 1406 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 100 includes a memory 1402, which stores instructions to perform a subset or all of the functions described herein. The memory 1402 can also include storage device.

As shown in FIG. 14, the high-speed circuitry 1426 includes a high-speed processor 1430, a memory 1402, and high-speed wireless circuitry 1432. In some examples, the image display driver 1420 is coupled to the high-speed circuitry 1426 and operated by the high-speed processor 1430 in order to drive the left and right image displays of the image display of optical assembly 1418. The high-speed processor 1430 may be any processor capable of managing high-speed communications and operation of any general computing system needed for the head-wearable apparatus 100. The high-speed processor 1430 includes processing resources needed for managing high-speed data transfers on a high-speed wireless connection 1414 to a wireless local area network (WLAN) using the high-speed wireless circuitry 1432. In certain examples, the high-speed processor 1430 executes an operating system such as a LINUX operating system or other such operating system of the head-wearable apparatus 100, and the operating system is stored in the memory 1402 for execution. In addition to any other responsibilities, the high-speed processor 1430 executing a software architecture for the head-wearable apparatus 100 is used to manage data transfers with high-speed wireless circuitry 1432. In certain examples, the high-speed wireless circuitry 1432 is configured to implement Institute of Electrical and Electronic Engineers (IEEE) 802.11 communication standards, also referred to herein as Wi-Fi. In some examples, other high-speed communications standards may be implemented by the high-speed wireless circuitry 1432.

The low-power wireless circuitry 1434 and the high-speed wireless circuitry 1432 of the head-wearable apparatus 100 can include short-range transceivers (Bluetooth™) and wireless wide, local, or wide area network transceivers (e.g., cellular or Wi-Fi). Mobile device 1450, including the transceivers communicating via the low-power wireless connection 1412 and the high-speed wireless connection 1414, may be implemented using details of the architecture of the head-wearable apparatus 100, as can other elements of the network 1416.

The memory 1402 includes any storage device capable of storing various data and applications, including, among other things, camera data generated by the left and right visible light cameras 1406, the infrared camera 1410, and the image processor 1422, as well as images generated for display by the image display driver 1420 on the image displays of the image display of optical assembly 1418. While the memory 1402 is shown as integrated with high-speed circuitry 1426, in some examples, the memory 1402 may be an independent standalone element of the head-wearable apparatus 100. In certain such examples, electrical routing lines may provide a connection through a chip that includes the high-speed processor 1430 from the image processor 1422 or the low-power processor 1436 to the memory 1402. In some examples, the high-speed processor 1430 may manage addressing of the memory 1402 such that the low-power processor 1436 will boot the high-speed processor 1430 any time that a read or write operation involving memory 1402 is needed.

As shown in FIG. 14, the low-power processor 1436 or high-speed processor 1430 of the head-wearable apparatus 100 can be coupled to the camera (visible light camera 1406, infrared emitter 1408, or infrared camera 1410), the image display driver 1420, the user input device 1428 (e.g., touch sensor or push button), and the memory 1402.

The head-wearable apparatus 100 is connected to a host computer. For example, the head-wearable apparatus 100 is paired with the mobile device 1450 via the high-speed wireless connection 1414 or connected to the server system 1404 via the network 1416. The server system 1404 may be one or more computing devices as part of a service or network computing system, for example, that includes a processor, a memory, and network communication interface to communicate over the network 1416 with the mobile device 1450 and the head-wearable apparatus 100.

The mobile device 1450 includes a processor and a network communication interface coupled to the processor. The network communication interface allows for communication over the network 1416, low-power wireless connection 1412, or high-speed wireless connection 1414. Mobile device 1450 can further store at least portions of the instructions for generating binaural audio content in the mobile device 1450's memory to implement the functionality described herein.

Output components of the head-wearable apparatus 100 include visual components, such as a display such as a liquid crystal display (LCD), a plasma display panel (PDP), a light-emitting diode (LED) display, a projector, or a waveguide. The image displays of the optical assembly are driven by the image display driver 1420. The output components of the head-wearable apparatus 100 further include acoustic components (e.g., speakers), haptic components (e.g., a vibratory motor), other signal generators, and so forth. The input components of the head-wearable apparatus 100, the mobile device 1450, and server system 1404, such as the user input device 1428, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 100 may also include additional peripheral device elements. Such peripheral device elements may include biometric sensors, additional sensors, or display elements integrated with the head-wearable apparatus 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1412 and high-speed wireless connection 1414 from the mobile device 1450 via the low-power wireless circuitry 1434 or high-speed wireless circuitry 1432.

Figure 15:
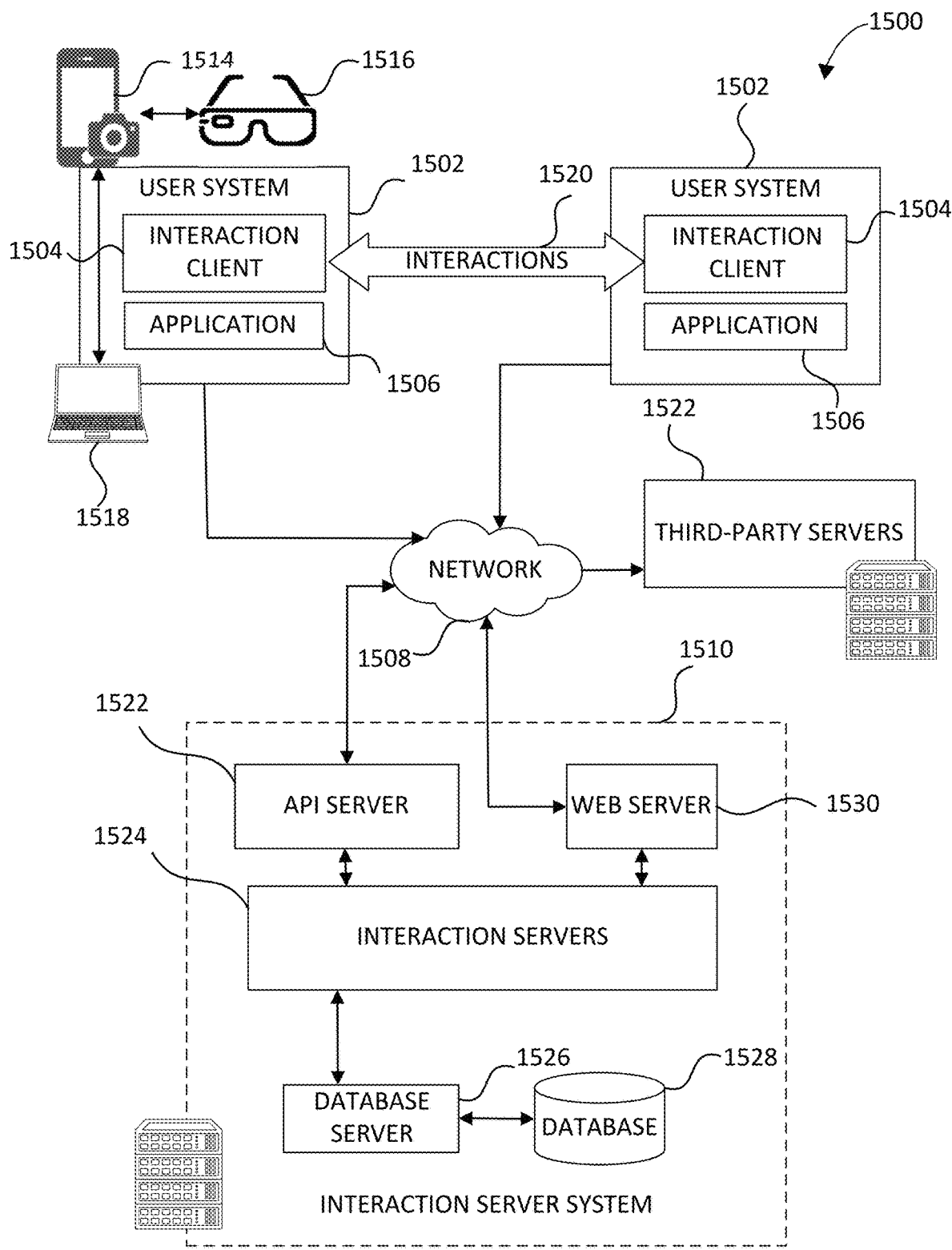
FIG. 15 is a diagrammatic representation of a networked environment in which the present disclosure may be deployed, in accordance with one or more examples.

FIG. 15 is a block diagram showing an example interaction system 1500 for facilitating interactions (e.g., exchanging text messages, conducting text audio and video calls, or playing games) over a network. The interaction systems 1500 includes multiple user systems 1502, each of which hosts multiple applications, including an interaction client 1504 and other applications 1506. Each interaction client 1504 is communicatively coupled, via one or more communication networks including a network 1508 (e.g., the Internet), to other instances of the interaction client 1504 (e.g., hosted on respective other user systems 1502), an interaction server system 1510 and third-party servers 1522). An interaction client 1504 can also communicate with locally hosted applications 1506 using Applications Program Interfaces (APIs).

Each user system 1502 may include multiple user devices, such as a mobile device 1514, head-wearable apparatus 1516, and a computer client device 1518 that are communicatively connected to exchange data and messages.

An interaction client 1504 interacts with other interaction clients 1504 and with the interaction server system 1510 via the network 1508. The data exchanged between the interaction clients 1504 (e.g., interactions 1520) and between the interaction clients 1504 and the interaction server system 1510 includes functions (e.g., commands to invoke functions) and payload data (e.g., text, audio, video, or other multimedia data).

The interaction server system 1510 provides server-side functionality via the network 1508 to the interaction clients 1504. While certain functions of the interaction systems 1500 are described herein as being performed by either an interaction client 1504 or by the interaction server system 1510, the location of certain functionality either within the interaction client 1504 or the interaction server system 1510 may be a design choice. For example, it may be technically preferable to initially deploy particular technology and functionality within the interaction server system 1510 but to later migrate this technology and functionality to the interaction client 1504 where a user system 1502 has sufficient processing capacity.

The interaction server system 1510 supports various services and operations that are provided to the interaction clients 1504. Such operations include transmitting data to, receiving data from, and processing data generated by the interaction clients 1504. This data may include message content, client device information, geolocation information, media augmentation and overlays, message content persistence conditions, social network information, and live event information. Data exchanges within the interaction systems 1500 are invoked and controlled through functions available via user interfaces (UIs) of the interaction clients 1504.

Turning now specifically to the interaction server system 1510, an Application Program Interface (API) server 1522 is coupled to and provides programmatic interfaces to interaction servers 1524, making the functions of the interaction servers 1524 accessible to interaction clients 1504, other applications 1506 and third-party server 1522. The interaction servers 1524 are communicatively coupled to a database server 1526, facilitating access to a database 1528 that stores data associated with interactions processed by the interaction servers 1524. Similarly, a web server 1530 is coupled to the interaction servers 1524 and provides web-based interfaces to the interaction servers 1524. To this end, the web server 1530 processes incoming network requests over the Hypertext Transfer Protocol (HTTP) and several other related protocols.

The Application Program Interface (API) server 1522 receives and transmits interaction data (e.g., commands and message payloads) between the interaction servers 1524 and the client systems 1502 (and, for example, interaction clients 1504 and other application 1506) and the third-party server 1522. Specifically, the Application Program Interface (API) server 1522 provides a set of interfaces (e.g., routines and protocols) that can be called or queried by the interaction client 1504 and other applications 1506 to invoke functionality of the interaction servers 1524. The Application Program Interface (API) server 1522 exposes various functions supported by the interaction servers 1524, including account registration; login functionality; the sending of interaction data, via the interaction servers 1524, from a particular interaction client 1504 to another interaction client 1504; the communication of media files (e.g., images or video) from an interaction client 1504 to the interaction servers 1524; the settings of a collection of media data (e.g., a story); the retrieval of a list of friends of a user of a user system 1502; the retrieval of messages and content; the addition and deletion of entities (e.g., friends) to an entity graph (e.g., a social graph); the location of friends within a social graph; and opening an application event (e.g., relating to the interaction client 1504).

Figure 16:
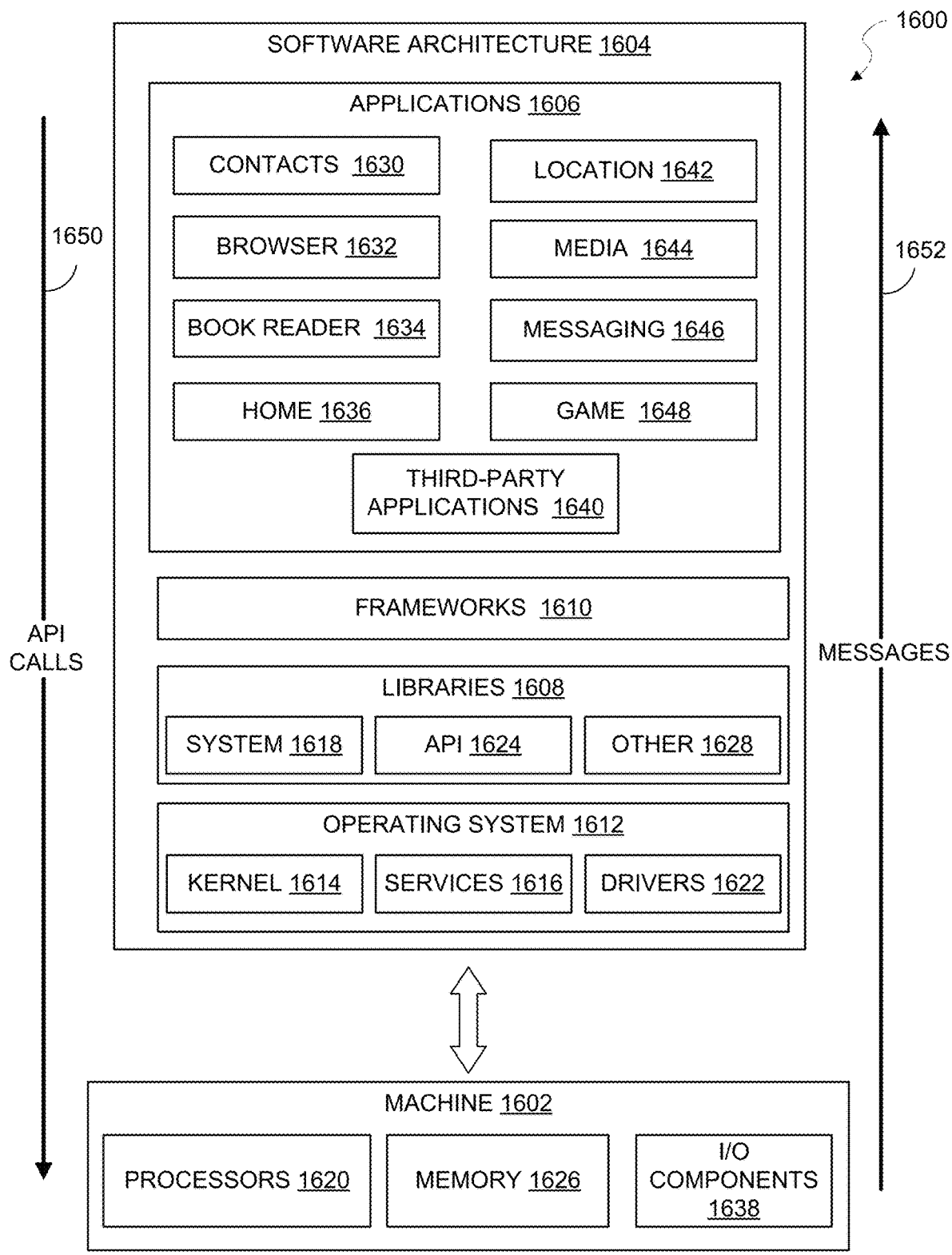
FIG. 16 is a block diagram showing a software architecture within which the present disclosure may be implemented, in accordance with one or more examples.

FIG. 16 is a block diagram 1600 illustrating a software architecture 1604, which can be installed on any one or more of the devices described herein. The software architecture 1604 is supported by hardware such as a machine 1602 that includes processors 1620, memory 1626, and I/O components 1638. In this example, the software architecture 1604 can be conceptualized as a stack of layers, where individual layers provide a particular functionality. The software architecture 1604 includes layers such as an operating system 1612, libraries 1608, frameworks 1610, and applications 1606. Operationally, the applications 1606 invoke API calls 1650 through the software stack and receive messages 1652 in response to the API calls 1650.

The operating system 1612 manages hardware resources and provides common services. The operating system 1612 includes, for example, a kernel 1614, services 1616, and drivers 1622. The kernel 1614 acts as an abstraction layer between the hardware and the other software layers. For example, the kernel 1614 provides memory management, processor management (e.g., scheduling), component management, networking, and security settings, among other functionalities. The services 1616 can provide other common services for the other software layers. The drivers 1622 are responsible for controlling or interfacing with the underlying hardware. For instance, the drivers 1622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1608 provide a low-level common infrastructure used by the applications 1606. The libraries 1608 can include system libraries 1618 (e.g., C standard library) that provide functions such as memory allocation functions, string manipulation functions, mathematic functions, and the like. In addition, the libraries 1608 can include API libraries 1624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g. OpenIMAJ), database libraries (e.g., SQLite to provide various relational database functions), web libraries (e.g., WebKit to provide web browsing functionality), and the like. The libraries 1608 can also include a wide variety of other libraries 1628 to provide many other APIs to the applications 1606.

The frameworks 1610 provide a high-level common infrastructure that is used by the applications 1606. For example, the frameworks 1610 provide various graphical user interface (GUI) functions, high-level resource management, and high-level location services. The frameworks 1610 can provide a broad spectrum of other APIs that can be used by the applications 1606, some of which may be specific to a particular operating system or platform.

In an example, the applications 1606 may include a home Application 1636, a contacts Application 1630, a browser Application 1632, a book reader Application 1634, a location Application 1642, a media Application 1644, a messaging Application 1646, a game Application 1648, and a broad assortment of other applications such as third-party applications 1640. The applications 1606 are programs that execute functions defined in the programs. Various programming languages can be employed to create one or more of the applications 1606, structured in a variety of manners, such as object-oriented programming languages (e.g., Objective-C, Java, or C++) or procedural programming languages (e.g., C or assembly language). In a specific example, the third-party applications 1640 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1640 can invoke the API calls 1650 provided by the operating system 1612 to facilitate functionality described herein.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an application specific integrated circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being an example of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A device comprising:
a camera;
one or more processors; and
memory storing instructions that, when executed by the one or more processors, cause the one or more processors to:
instruct the camera to capture one or more first images of an environment, the one or more first images including one or more objects located in the environment, and to capture one or more second images indicating motion of an augmented reality graphics tool;
determine that an object of the one or more objects is an alignment object, the alignment object corresponding to an origin of a real-world coordinate system that corresponds to locations in the environment;
receiving a message including an invitation for a user of the device to join an augmented reality graphics creation session, wherein the augmented reality graphics creation session includes a plurality of users creating augmented reality graphics;
responsive to input for the user to join the augmented reality graphics creation session, obtaining an identifier of the augmented reality graphics creation session;
determine a location of an augmented reality graphic within the environment, wherein the augmented reality graphic corresponds to the motion of the augmented reality graphics tool and the location of the augmented reality graphic includes one or more real-world coordinates of the real-world coordinate system; and
generate one or more user interfaces that display the augmented reality graphic as an overlay of a real-world scene that comprises the location of the augmented reality graphic.

2. The device of claim 1, comprising:
a frame including:
a first optical element holder including a first optical element;
a second optical element holder including a second optical element;
a bridge connecting the first optical element holder and the second optical element holder;
a left temple piece; and
a right temple piece.

3. The device of claim 2, wherein:
the first optical element includes a first display device;
the second optical element includes a second display device; and
the one or more user interfaces are displayed by at least one of the first display device or the second display device.

4. The device of claim 1, wherein the augmented reality graphic is stored in association with the identifier of the augmented reality graphics creation session.

5. The device of claim 1, wherein the memory stores additional instructions that, when executed by the one or more processors, cause the one or more processors to:
generate first camera data that includes the one or more first images and the identifier of the augmented reality graphics creation session;
send the first camera data to an augmented reality graphics system;
generate second camera data that includes the one or more second images and the identifier of the augmented reality graphics creation session; and
send the second camera data to the augmented reality graphics system.

6. The device of claim 1, wherein:
the one or more user interfaces are displayed in relation to one or more first additional images captured within a first field of view of the camera; and
the memory stores additional instructions that, when executed by the one or more processors, cause the one or more processors to:
instruct the camera to capture one or more second additional images within a second field of view of the camera, the one or more second additional images corresponding to one or more additional locations in the environment; and
receive augmented reality graphics display data that includes an additional augmented reality graphic that corresponds to an additional device included in the augmented reality graphics creation session.

7. The device of claim 6, wherein the memory stores additional instructions that, when executed by the one or more processors, cause the one or more processors to:
generate one or more additional user interfaces that display the additional augmented reality graphic as an additional overlay at an additional location of the one or more additional locations.

8. The device of claim 1, wherein:
the memory stores additional instructions that, when executed by the one or more processors, cause the one or more processors to:
activate an augmented reality content item that is executed within a user application; and
the augmented reality graphics creation session is conducted within the augmented reality content item.

9. A computer-implemented method comprising:
instructing, by a device comprising one or more processors and memory, a camera of the device to capture one or more first images of an environment, the one or more first images including one or more objects located in the environment, and to capture one or more second images indicating motion of an augmented reality graphics tool;

determining, by the device, that an object of the one or more objects is an alignment object, the alignment object corresponding to an origin of a real-world coordinate system that corresponds to locations in the environment;

receiving, by the device, a message including an invitation for a user of the device to join an augmented reality graphics creation session, wherein the augmented reality graphics creation session includes a plurality of users creating augmented reality graphics;

responsive to input for the user to join the augmented reality graphics creation session, obtaining, by the device, an identifier of the augmented reality graphics creation session;

determining, by the device, a location of an augmented reality graphic within the environment, wherein the augmented reality graphic corresponds to the motion of the augmented reality graphics tool and the location of the augmented reality graphic includes one or more real-world coordinates of the real-world coordinate system; and generating, by the device, one or more user interfaces that display the augmented reality graphic as an overlay of a real-world scene that comprises the location of the augmented reality graphic.

10. The computer-implemented method of claim 9, wherein:
the device comprises:
a frame including:
a first optical element holder including a first display device;
a second optical element holder including a second display device;
a bridge connecting the first optical element holder and the second optical element holder;
a left temple piece; and
a right temple piece; and
the one or more user interfaces are displayed by at least one of the first display device or the second display device.

11. The computer-implemented method of claim 10, wherein the augmented reality graphic has a priority in relation to one or more additional augmented reality graphics created by one or more additional users included in the augmented reality graphics creation session.

12. The computer-implemented method of claim 9, comprising:
generating, by the device, first camera data that includes the one or more first images and the identifier of the augmented reality graphics creation session;
sending, by the device, the first camera data to an augmented reality graphics system;
generating, by the device, second camera data that includes the one or more second images and the identifier of the augmented reality graphics creation session; and
sending, by the device, the second camera data to the augmented reality graphics system.

13. The computer-implemented method of claim 9, wherein:
the one or more user interfaces are displayed in relation to one or more first additional images captured within a first field of view of the camera; and the method comprises:
instructing, by the device, the camera to capture one or more second additional images within a second field of view of the camera, the one or more second additional images corresponding to one or more additional locations in the environment; and
receiving, by the device, augmented reality graphics display data that includes an additional augmented reality graphic that corresponds to an additional device included in the augmented reality graphics creation session.

14. The computer-implemented method of claim 13, comprising:
generating, by the device, one or more additional user interfaces that display the additional augmented reality graphic as an additional overlay at an additional location of the one or more additional locations.

15. The computer-implemented method of claim 9, comprising:
activating, by the device, an augmented reality content item that is executed within a user application;
wherein the augmented reality graphics creation session is conducted within the augmented reality content item.

16. One or more non-transitory computer-readable storage media, comprising computer-readable instructions that, when executed by one or more processors, cause the one or more processors to:
instruct a camera of a device to capture one or more first images of an environment, the one or more first images including one or more objects located in the environment, and to capture one or more second images indicating motion of an augmented reality graphics tool;
determine that an object of the one or more objects is an alignment object, the alignment object corresponding to an origin of a real-world coordinate system that corresponds to locations in the environment;
receiving a message including an invitation for a user of the device to join an augmented reality graphics creation session, wherein the augmented reality graphics creation session includes a plurality of users creating augmented reality graphics;
responsive to input for the user to join the augmented reality graphics creation session, obtaining an identifier of the augmented reality graphics creation session;
determine a location of an augmented reality graphic within the environment, wherein the augmented reality graphic corresponds to the motion of the augmented reality graphics tool and the location of the augmented reality graphic includes one or more real-world coordinates of the real-world coordinate system; and
generate one or more user interfaces that display the augmented reality graphic as an overlay of a real-world scene that comprises the location of the augmented reality graphic.

17. The one or more non-transitory computer-readable storage media of claim 16, wherein:
the device comprises a frame including:
a first optical element holder including a first display device;
a second optical element holder including a second display device;
a bridge connecting the first optical element holder and the second optical element holder;
a left temple piece; and
a right temple piece; and the one or more user interfaces are displayed by at least one of the first display device or the second display device.

18. The one or more non-transitory computer-readable storage media of claim 16, wherein the message includes a link that is selectable for the user to join the augmented reality graphics creation session and the link encodes at least one of the identifier of the augmented reality graphics creation session, an identifier of the user, or a priority of the user in relation to one or more additional users included in the augmented reality graphics creation session.

19. The one or more non-transitory computer-readable storage media of claim 16, storing additional computer-readable instructions that, when executed by one or more processors, cause the one or more processors to:

generate first camera data that includes the one or more first images and the identifier of the augmented reality graphics creation session;

send the first camera data to an augmented reality graphics system;

generate second camera data that includes the one or more second images and the identifier of the augmented reality graphics creation session; and send the second camera data to the augmented reality graphics system.

20. The one or more non-transitory computer-readable storage media of claim 16, storing additional computer-readable instructions that, when executed by one or more processors, cause the one or more processors to:

activate an augmented reality content item that is executed within a user application;

wherein the augmented reality graphics creation session is conducted within the augmented reality content item.

* * * * *